(12) United States Patent
Ishikawa et al.

(10) Patent No.: US 9,586,795 B2
(45) Date of Patent: Mar. 7, 2017

(54) CHAIN BLOCK AND LOAD CHAIN

(71) Applicant: KITO CORPORATION, Nakakoma-gun, Yamanashi (JP)

(72) Inventors: Kazumistu Ishikawa, Yamanashi (JP); Kosuke Kosuga, Yamanashi (JP)

(73) Assignee: KITO CORPORATION, Nakakoma-Gun, Yamanashi (JP)

( * ) Notice: Subject to any disclaimer, the term of this patent is extended or adjusted under 35 U.S.C. 154(b) by 0 days.

(21) Appl. No.: 14/648,791

(22) PCT Filed: Nov. 26, 2013

(86) PCT No.: PCT/JP2013/081776
§ 371 (c)(1),
(2) Date: Jun. 1, 2015

(87) PCT Pub. No.: WO2014/084207
PCT Pub. Date: Jun. 5, 2014

(65) Prior Publication Data
US 2015/0314998 A1    Nov. 5, 2015

(30) Foreign Application Priority Data

Nov. 30, 2012 (JP) .................................. 2012-262615

(51) Int. Cl.
*B66D 3/16* (2006.01)
*F16G 13/12* (2006.01)
(Continued)

(52) U.S. Cl.
CPC ............... *B66D 3/16* (2013.01); *F16G 13/12* (2013.01); *F16G 15/00* (2013.01); *F16G 15/12* (2013.01)

(58) Field of Classification Search
CPC . B66D 3/16; F16G 13/12; F16G 15/00; F16G 15/12
See application file for complete search history.

(56) References Cited

U.S. PATENT DOCUMENTS 3,030,076 A * 4/1962 Stevens ..................... B66C 1/34
254/358
5,445,570 A * 8/1995 White ...................... F16G 13/04
474/213

(Continued)

FOREIGN PATENT DOCUMENTS

EP    0602946 A1    6/1994
JP    4638002 B1    11/1971

(Continued)

OTHER PUBLICATIONS

Japanese Notice of Reasons for Rejection corresponding to Application No. 2012-262615; Mailing Date: Feb. 2, 2016; with English translation.

(Continued)

*Primary Examiner* — Emmanuel M Marcelo
(74) *Attorney, Agent, or Firm* — Cantor Colburn LLP

(57) ABSTRACT

A chain block is provided including a load chain which hangs a load, and a load sheave member which is rotatably supported between a first frame and a second frame, around which the load chain is wound, and which has a chain pocket in which the load chain goes, the load chain is made of a steel material having the Rockwell hardness C scale (HRC) of 47 to 51, and the load sheave member is made of a steel material in which at least the chain pocket has the Rockwell hardness C scale (HRC) of 40 to 45.

2 Claims, 31 Drawing Sheets

(51) Int. Cl.
*F16G 15/00* (2006.01)
*F16G 15/12* (2006.01)

(56) References Cited

U.S. PATENT DOCUMENTS

| | | | | |
|---|---|---|---|---|
| 5,556,078 A | * | 9/1996 | Kubota | B66D 3/16 188/251 A |
| 5,956,936 A | * | 9/1999 | Ianello | E02F 3/58 59/3 |
| 6,062,543 A | * | 5/2000 | Kobayasi | B66D 3/16 254/372 |
| 2003/0213226 A1 | * | 11/2003 | Moehnke | F16G 13/12 59/78 |
| 2013/0001489 A1 | | 1/2013 | Ishikawa | |

FOREIGN PATENT DOCUMENTS

| JP | S4638002 B1 | 11/1971 |
|---|---|---|
| JP | 50131632 A | 10/1975 |
| JP | S58221045 A | 12/1983 |
| JP | 1989106494 A | 7/1989 |
| JP | H10310377 A | 11/1998 |
| JP | 2004143526 A | 5/2004 |
| JP | 2011201637 A | 10/2011 |

OTHER PUBLICATIONS

Chinese Notification of the First Office Action correponding to Patent No. 201380062099.1; Issue Date Apr. 5, 2016, with English translation.
English translation of parts in Japanese Notice of Reasons for Rejection corresponding to Application No. 2012-262615; Mailing Date: Feb. 2, 2016.
International Search Report corresponding to Application No. PCT/JP2013/081776; Date of Mailing: Mar. 4, 2014.
Extended European Search Report corresponding to Application No. 13857965.1-1705/2927181 PCT/JP2013/081776; Date of Mailing: Sep. 16, 2016.

* cited by examiner

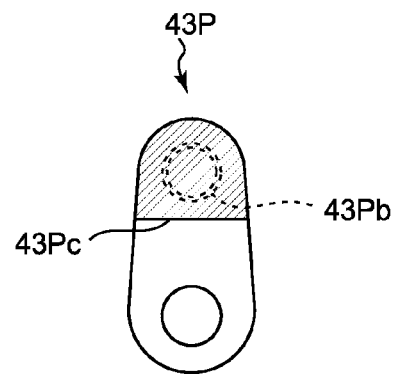
Fig.12
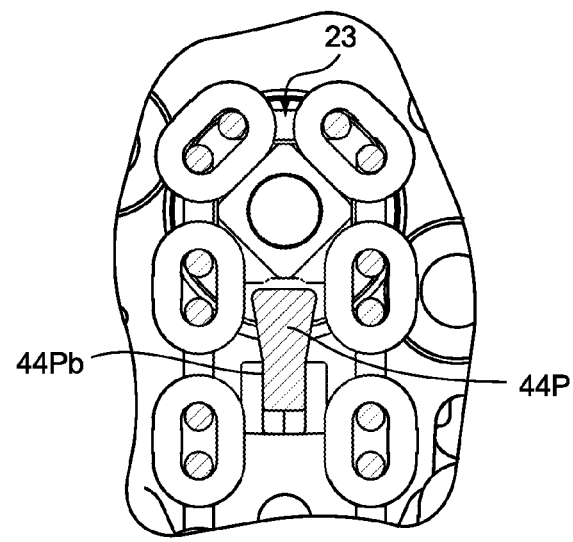
Fig.13
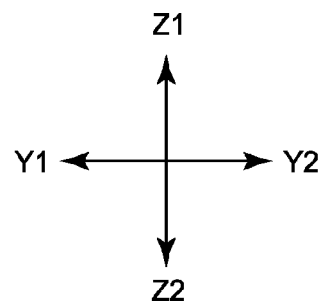

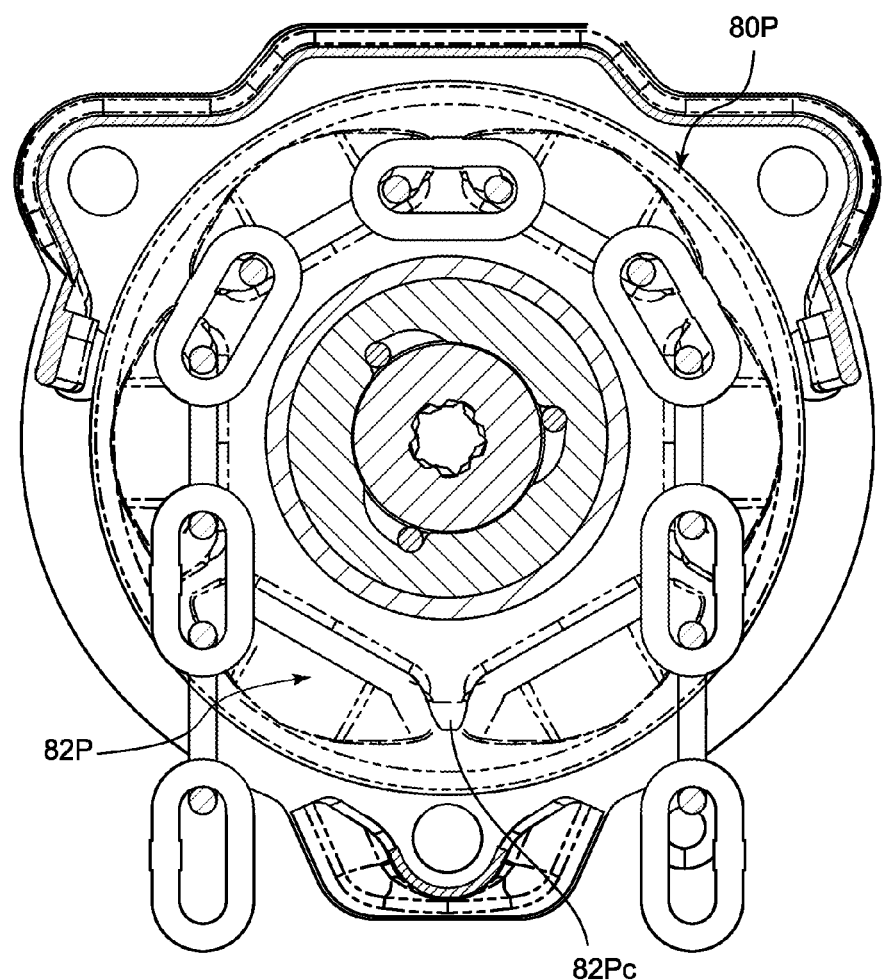
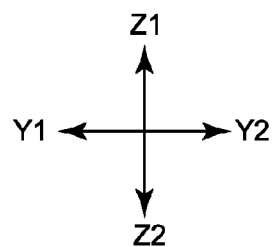
Fig.20

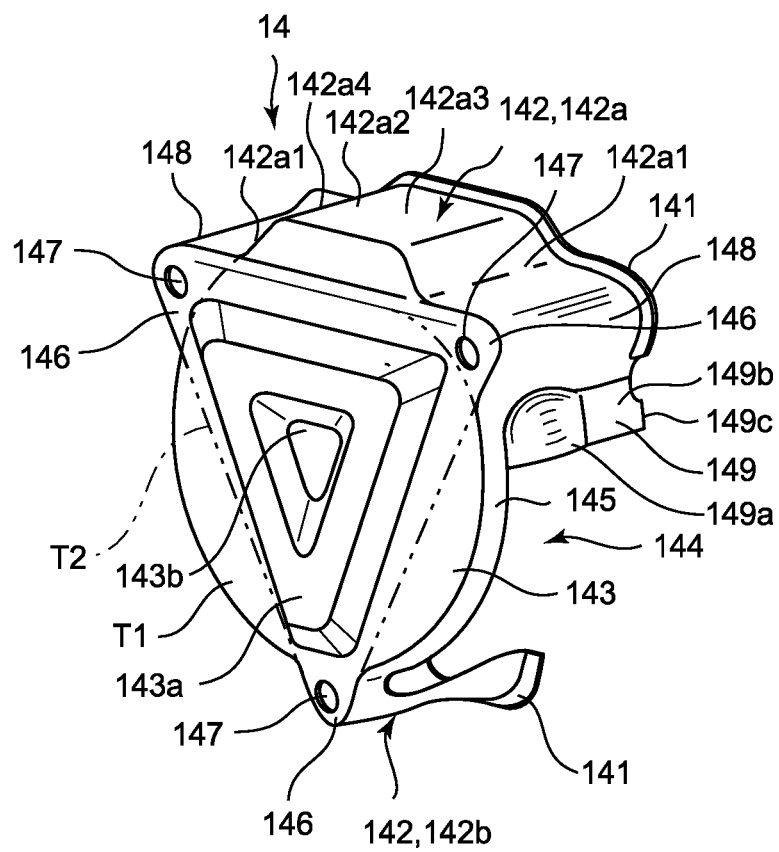
Fig.23
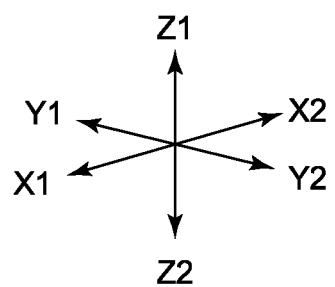

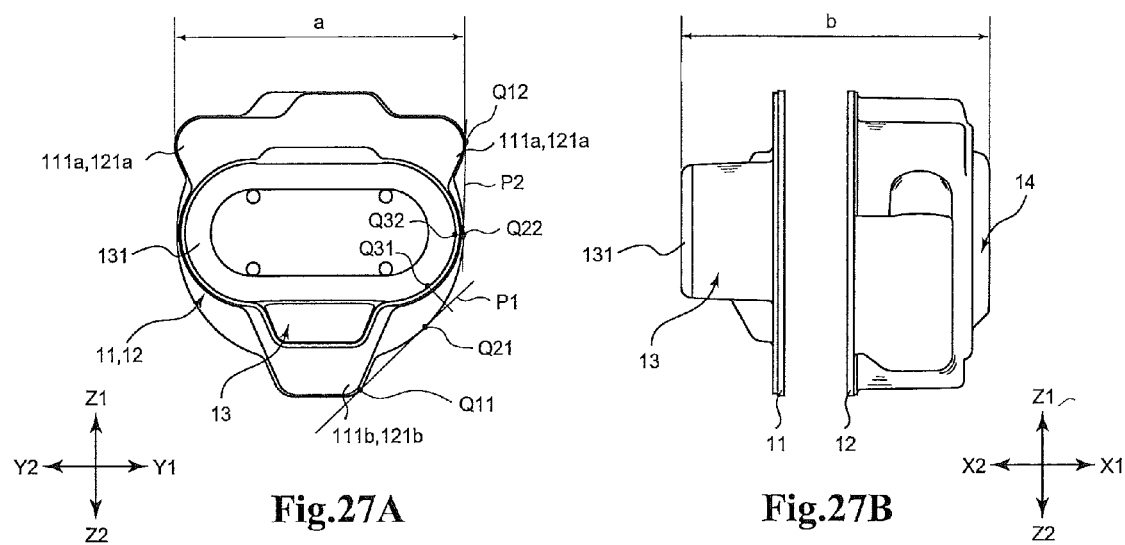

CHAIN BLOCK AND LOAD CHAIN

This is a U.S. national stage of application No. PCT/JP2013/081776, filed on Nov. 26, 2013. Priority under 35 U.S.C. §119(a) and 35 U.S.C. §365(b) is claimed from Japanese Patent Applications No. 2012-262615 filed on Nov. 30, 2012, the disclosure of which is also incorporated herein by reference.

TECHNICAL FIELD

The present invention relates to a chain block and a load chain for use in a load hoisting work.

BACKGROUND ART

A chain block is used in general to move a load in an up-down direction. The chain block includes a hand wheel, a wheel cover, a main body portion, and the like. The main body portion is provided with a load sheave around which a load chain is wound. When a hand chain wound around the hand wheel is wound up, the hand wheel is rotated, and the rotation is transmitted via a predetermined transmission mechanism including gears and the like to the load sheave. Accordingly, the load hung on a lower hook moves in an upper direction. Conversely, when the hand chain is wound down in a state in which the load is located on an upper side, the load moves in a lower direction. An example of such a chain block is disclosed in Patent Literature 1.

CITATION LIST

Patent Literature

{PTL 1}: JP 2011-201637 A

SUMMARY OF INVENTION

Technical Problem

Meanwhile, as for the chain block, there is a demand for size reduction and weight reduction to improve easiness of handling and the like. In an attempt to such size reduction and weight reduction, use of the chain block having a small chain pocket of the load sheave and the load chain with a small diameter is considered. Thus, improvement in strength of the load chain is considered so as to enable a predetermined safety ratio to be secured even with reduction in the diameter of the load chain.

In general, when the strength of the load chain is improved, the load chain gets harder in proportion to this. Also, in a case in which the load chain gets harder, hardness of the load sheave is normally improved to correspond to this. This causes the following problem.

That is, when the hardness of the load sheave is improved to correspond to improvement in the strength and the hardness of the load chain, a phenomenon in which a part of the load chain contacting the load sheave is unevenly abraded easily, and in which the uneven abrasion causes the load chain to be broken easily, is confirmed.

The present invention is achieved based on the above circumstances, and an object thereof is to provide a chain block and a load chain enabling to reduce abrasion of a load chain even with a small diameter by adjusting a balance between hardness of the load chain corresponding to strength of the load chain and hardness of a load sheave.

Solution to Problem

To solve the above problems, according to a first aspect of the present invention, a chain block is provided including a load chain which hangs a load, and a load sheave member which is rotatably supported between a first frame and a second frame, around which the load chain is wound, and which has a chain pocket in which the load chain goes, the load chain is made of a steel material having the Rockwell hardness C scale (HRC) of 47 to 51, and the load sheave member is made of a steel material in which at least the chain pocket has the Rockwell hardness C scale (HRC) of 40 to 45.

Also, according to another aspect of the present invention, in the aforementioned invention, the load chain is preferably produced to have uniform hardness on an entire cross-section thereof.

Further, according to another aspect of the present invention, in the aforementioned invention, the load chain is preferably a quenched and tempered chain to which thermal refining has been applied.

Also, according to a second aspect of the present invention, a load chain is provided which hangs a load, which winds around a load sheave member of a chain block, and which goes in a chain pocket of the load sheave member in use, the load chain is preferably made of a steel material having the Rockwell hardness C scale (HRC) of 47 to 51, and the load chain preferably goes and slides in the chain pocket made of a steel material having the Rockwell hardness C scale (HRC) of 40 to 45.

Advantageous Effects of Invention

The present invention provides a chain block and a load chain enabling to reduce abrasion of a load chain even with a small diameter by adjusting a balance between hardness of the load chain corresponding to strength of the load chain and hardness of a load sheave.

BRIEF DESCRIPTION OF DRAWINGS

FIG. 8(A) illustrates the shape seen from a front side, and FIG. 8(B) illustrates the shape seen from a back side.

FIG. 10(A) illustrates a front cross-sectional view, and FIG. 10(B) illustrates a side view.

FIG. 12 is a front cross-sectional view illustrating a configuration of a conventional fastener.

FIG. 13 is a front cross-sectional view illustrating a configuration of a conventional stripper.

FIG. 15(A) illustrates the shape seen from a front side, and FIG. 15(B) illustrates the shape seen from a back side.

FIG. 16(A) is a perspective view seen from a front side, FIG. 16(B) is a perspective view seen from a back side, and FIG. 16(C) is a partially enlarged side cross-sectional view illustrating the shape around a flange portion.

FIG. 20 illustrates a chain pocket of a hand wheel in a conventional chain block.

FIG. 23 is a perspective view illustrating a shape of a wheel cover in the chain block in FIG. 1.

FIG. 25(A) illustrates a state in which the force acts on a side surface portion of a wheel cover having a conventional configuration, and FIG. 25(B) illustrates a state in which the force acts on a surrounding portion.

FIG. 27(A) is a front view illustrating a dimension in a Y direction on a side of a gear case of the chain block in FIG. 1, and FIG. 27(B) is a side view illustrating a dimension in an X direction of the chain block in FIG. 1.

DESCRIPTION OF EMBODIMENTS

Figure 1:
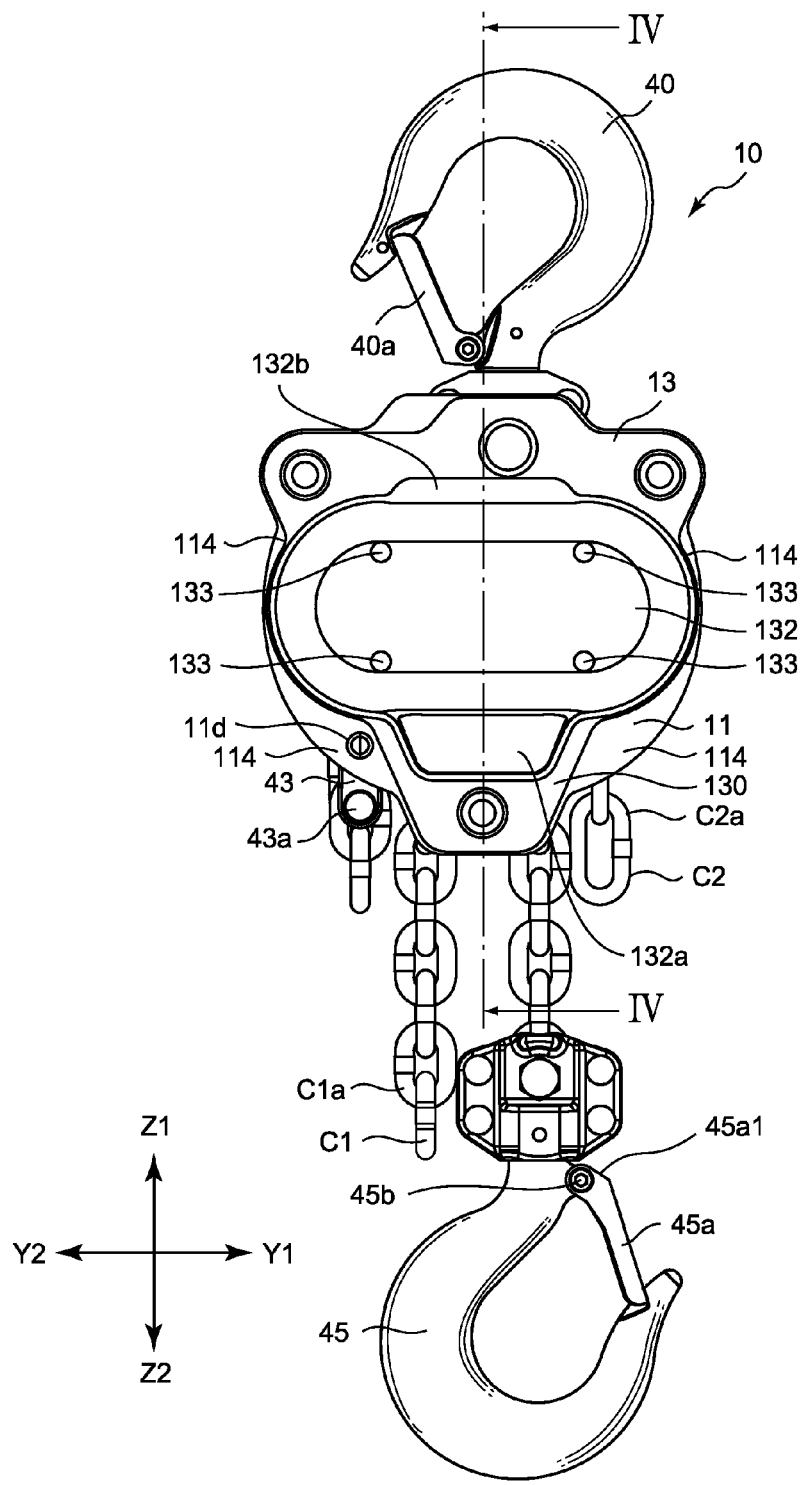
FIG. 1 is a front view illustrating an appearance of a chain block according to an embodiment of the present invention.

Hereinbelow, a chain block 10 according to an embodiment of the present invention will be described with reference to the drawings.

<About Configuration of Chain Block>

As illustrated in FIGS. 1 to 5 and the like, a chain block 10 includes a first frame 11, a second frame 12, a gear case 13, a wheel cover 14, a load sheave hollow shaft 20, and a speed reducing mechanism 30, and these are fixed via stay bolts SB (corresponding to fastening tools) and nuts N. Members are attached between the first frame 11 and the second frame 12, between the first frame 11 and the gear case 13, and between the second frame 12 and the wheel cover 14, and some of the members project from between them. The members will be described below.

Figure 4:
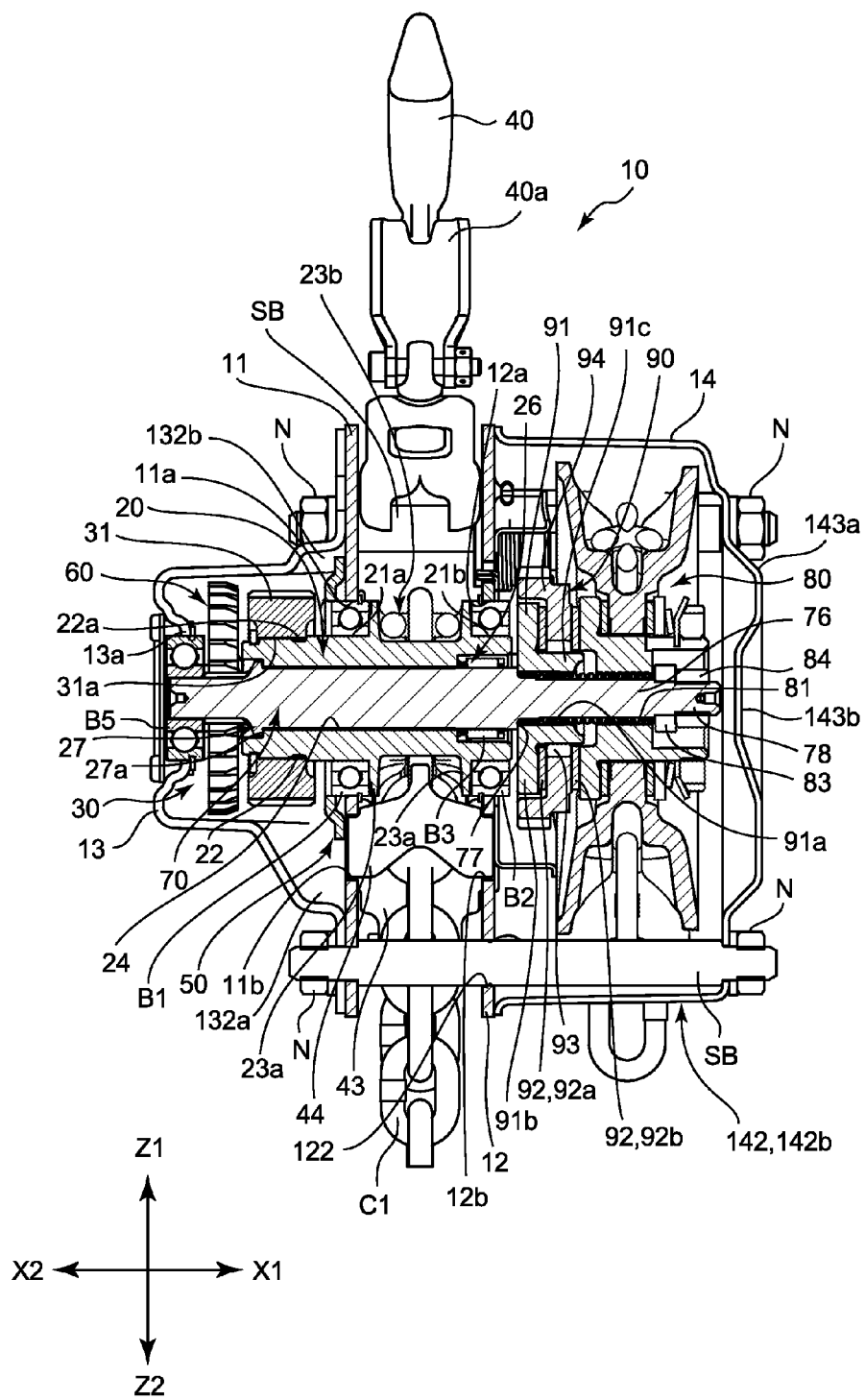
FIG. 4 is a side cross-sectional view illustrating a state in which the chain block has been cut along the line IV-IV in FIG. 1.
Figure 5:
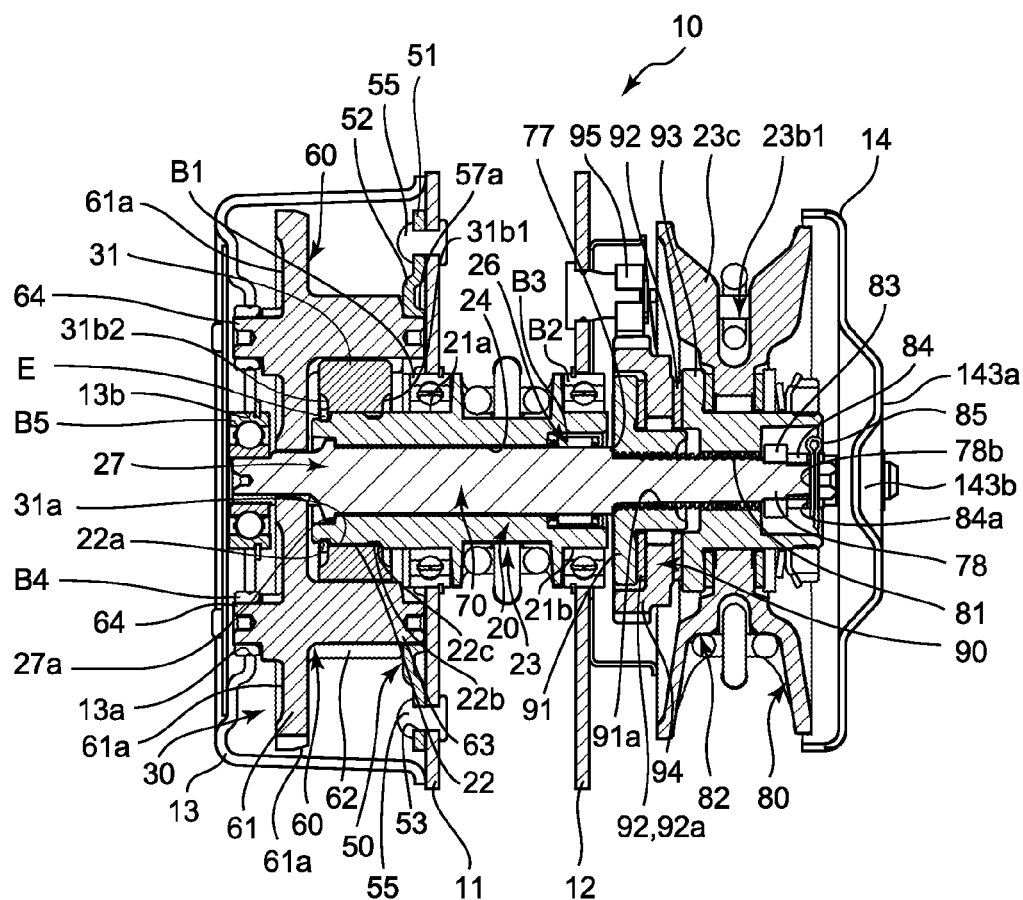
FIG. 5 is a side cross-sectional view illustrating a state in which the chain block has been cut along the line V-V in FIG. 2.

Between the first frame 11 and the second frame 12 are situated a part of the load sheave hollow shaft 20, an upper hook 40, guide rollers 42, a fastener 43, a stripper 44, and the like. As illustrated in FIGS. 4 and 5, the load sheave hollow shaft 20 is supported in the first frame 11 and the second frame 12 via bearings B1 and B2 such as ball bearings to be fitted in respective insertion holes 11a and 12a of the first frame 11 and the second frame 12. That is, on outer circumferences of bearing fitting portions 21a and 21b out of the load sheave hollow shaft 20, the bearings B1 and B2 are situated, and the bearings B1 and B2 are situated in the insertion holes 11a and 12a. Accordingly, the load sheave hollow shaft 20 is supported in the first frame 11 and the second frame 12. Meanwhile, the load sheave hollow shaft 20 corresponds to a load sheave member.

Figure 6:
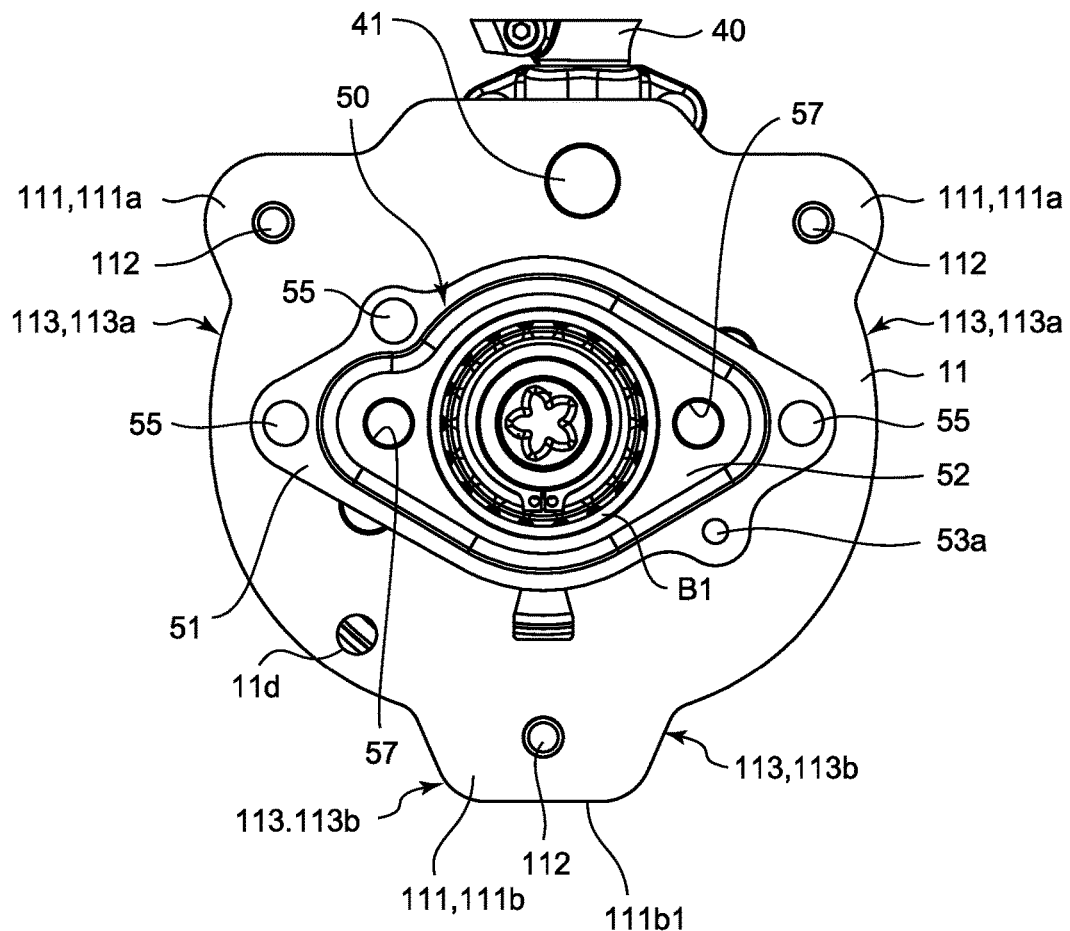
FIG. 6 is a front view illustrating shapes of a first frame and an auxiliary plate in a state in which a speed reducing gear member and a load gear are removed in the chain block in FIG. 1.
Figure 11:
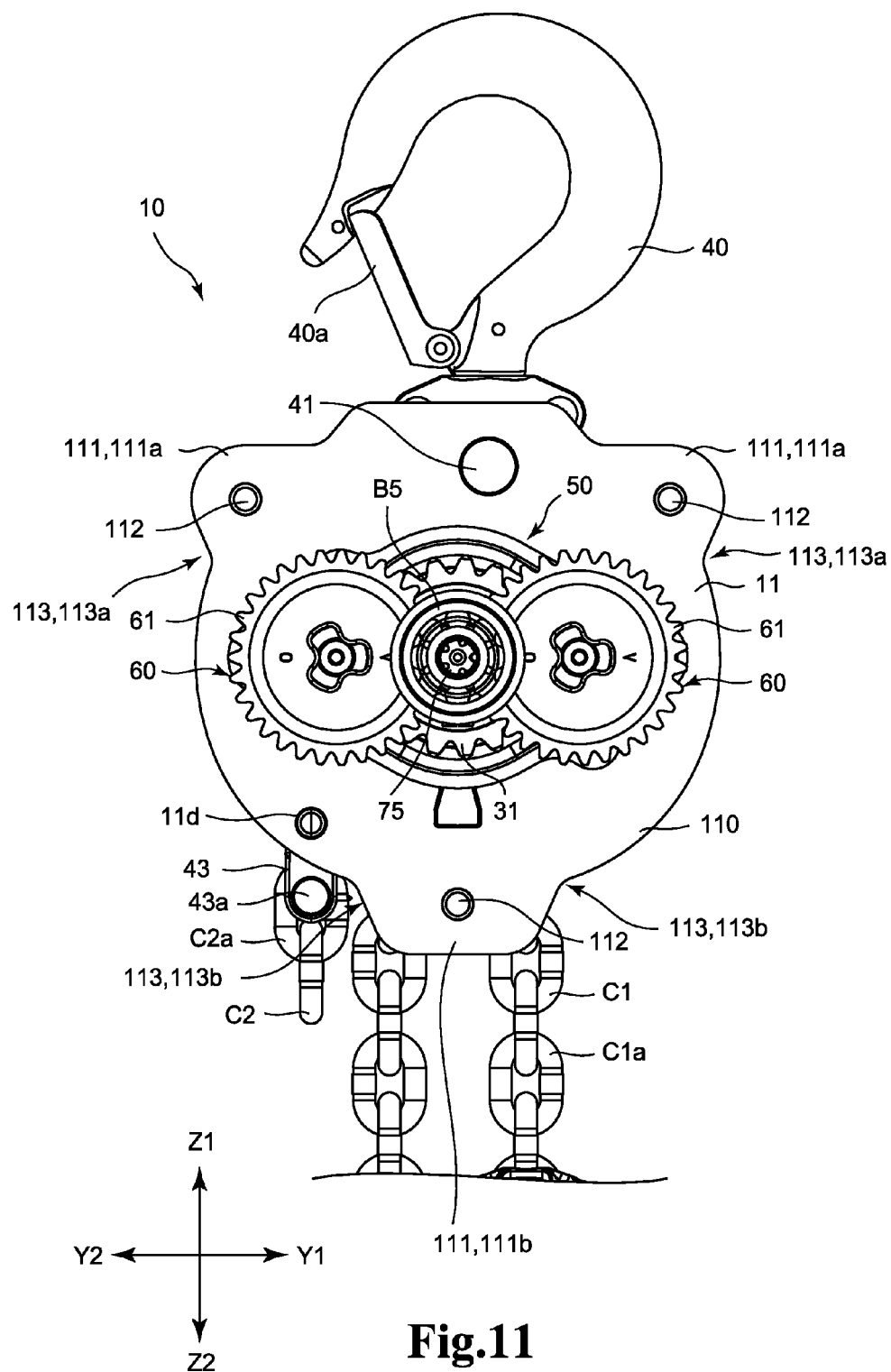
FIG. 11 illustrates arrangement of the speed reducing gear member and the load gear to the first frame in the chain block in FIG. 1.

As illustrated in FIGS. 6 and 11, the first frame 11 includes a circular portion 110 formed in a circular shape and frame projection portions 111 projecting from this circular portion 110. The three frame projection portions 111 are provided in total: two on an upper side (Z1 side) and one on a lower side (Z2 side).

Each of these frame projection portions 111 is a part for preventing rolling of the chain block 10 and a part functioning as a rolling restriction portion as described below. That is, a case in which the chain block 10 is dragged via a load chain C1 when the chain block 10 is in a standing posture in which the first frame 11 and the second frame 12 contact the ground (hereinbelow, such a posture is referred to as a standing posture) is considered. In this case, the chain block 10 almost rolls due to a tensile force via the load chain C1. However, in a case in which the frame projection portions 111 exist as in the present embodiment, such rolling is prevented, and the load chain C1 is dragged with the frame projection portion 111 kept in a state of abutting on the ground.

Meanwhile, in the present embodiment, the three frame projection portions 111 are provided to form an isosceles triangle when linear parts at side edges thereof are connected. However, the frame projection portions 111 may project from the circular portion 110 in any manner as long as the chain block 10 is prevented from rolling when it is dragged, and as long as the chain block 10 is dragged in a state of abutting on the ground. Also, in the present embodiment, although a part on which the chain block 10 is installed (installation part) is regarded as the ground, an installation part other than the ground (such as a floor) may be regarded as the ground.

Also, each of the frame projection portions 111 is provided with an insertion hole 112 in which the stay bolt SB is to be inserted. The three insertion holes 112 in total are provided to form an isosceles triangle when they are connected but may be provided to form an equilateral triangle or an approximately equilateral triangle. Also, the three insertion holes 112 in total may be provided to form a triangle other than the isosceles triangle when they are connected.

As illustrated in FIGS. 6 and 11, a pair of frame projection portions 111*a* located on the upper side (Z1 side) out of the aforementioned frame projection portions 111 is arranged along a Y direction. A part on the lower side (Z2 side) of an outer rim portion of each of the frame projection portions 111*a* and an outer rim portion of the circular portion constitute a recess 113. The recess 113 is a part which reduces a width dimension of the first frame 11 between the circular portion 110 and a lateral side on the lower side (Z2 side) of the frame projection portion 111*a*. Hence, one can grip the chain block 10 by locating separate fingers or the like on the recesses 113 as a pair. That is, one can grip or hold the chain block 10 at the recesses 113 instead of at the upper hook 40. Meanwhile, one can grip or hold the chain block 10 by locating a separate gripping tool or holding tool, instead of the fingers, on the respective recesses 113 as the pair for carriage, storage, packing, or the like of the chain block 10.

Also, in the case in which the chain block 10 is dragged in a state of the standing posture, the recess 113 does not contact the ground. Thus, the recess 113 functions to keep a distance between a part of the circular portion 110 contacting the ground and a part of the frame projection portion 111 contacting the ground. In this manner, since the circular portion 110 and the frame projection portion 111 contact the ground at separate positions, the chain block 10 is hard to roll when the chain block 10 is dragged in the standing posture.

Meanwhile, the frame projection portion 111 residing on the lower side (Z2 side) is referred to as a frame projection portion 111*b* as needed. An end surface on the Z2 side of this frame projection portion 111*b* is a flat portion 111*b*1 parallel to a Y axis, and providing the flat portion 111*b*1 enables the chain block 10 to stand by itself without falling. This facilitates carriage, storage, packing, or the like of the chain block 10.

Also, the recesses 113 are provided on both sides in the Y direction of the frame projection portion 111*b* as well. Providing each of these recesses 113 keeps a distance between a part of the circular portion 110 contacting the ground and a part of the frame projection portion 111*b* contacting the ground. Thus, the chain block 10 is hard to roll when the chain block 10 is dragged in the standing posture. In the following description, the recess 113 adjacent to the frame projection portion 111*a* is referred to as a recess 113*a* while the recess 113 on each side of the frame projection portion 111*b* is referred to as a recess 113*b*.

Figure 9:
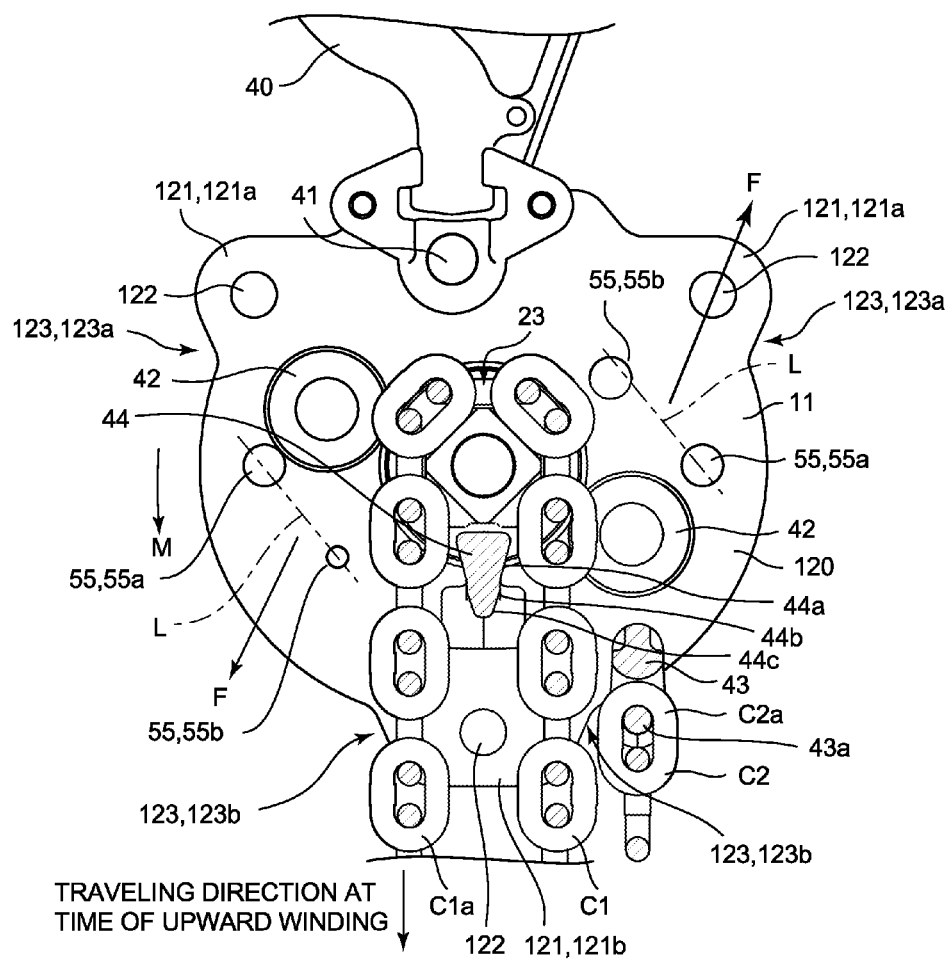
FIG. 9 illustrates positional relationship of attaching positions of fixing tools and guide rollers to the first frame in the chain block in FIG. 1.

As illustrated in FIG. 9, the second frame 12 is also provided with a circular portion 120, frame projection portions 121 (121*a*, 121*b*), insertion holes 122, and recesses 123 (123*a*, 123*b*) similar to those in the aforementioned first frame 11. However, since these are configured similarly to the respective parts in the first frame 11, description of these respective parts is omitted. Also, the second frame 12 corresponds to a frame member. However, the first frame 11 may correspond to the frame member, or both the first frame 11 and the second frame 12 may correspond to the frame member.

Also, as illustrated in FIGS. 4 and 5, further on a side of the gear case 13 than the bearing fitting portion 21*a* on a side of the first frame 11 in the load sheave hollow shaft 20, a gear fitting portion 22 is provided, and on this gear fitting portion 22, a load gear 31 constituting the speed reducing mechanism 30 is held by means of a spline connection. Meanwhile, on the side of the gear case 13 in the gear fitting portion 22, a groove 22*a* to which a snap ring E is attached is provided. The snap ring E is attached to this groove 22*a* to regulate movement of the load gear 31 to an X2 side. On the other hand, at a part of the gear fitting portion 22 on a side of the bearing fitting portion 21*a* is formed a clearance groove 22*b* for a spline process, and at a part thereof further on the side of the bearing fitting portion 21*a* than the clearance groove 22*b* is provided a fixing step 22*c* having a larger diameter than that of the gear fitting portion 22. This fixing step 22*c* regulates movement of the load gear 31 to an X1 side.

The load gear 31 is provided with a center hole 31*a* in which the aforementioned gear fitting portion 22 is inserted. In addition, as illustrated in FIGS. 4 and 5, on circumferences of the center hole 31*a* in both end sides of the load gear 31 are provided recesses 31*b*. Each of the recesses 31*b* is formed in a shape in which both the end surfaces of the load gear 31 are dented to a certain extent. That is, as illustrated in FIGS. 4 and 5, a recess 31*b*1 dented in the end surface of the load gear 31 on the X1 side is opposed to the bearing B1, and existence of the recess 31*b*1 enables a space between the load gear 31 and the bearing B1 to be enlarged. Thus, in a case in which the load gear 31 is rotated in a state in which machine oil (grease) exists between the load gear 31 and the bearing B1, a mechanical loss generated by viscosity of the machine oil (grease) can be reduced, and fluidity of the machine oil (grease) can be improved at the time of rotation of the load gear 31. Similarly, a recess 31*b*2 dented in the end surface of the load gear 31 on the X2 side is opposed to a large-diameter gear 61 of a speed reducing gear member 60, and existence of the recess 31*b*2 enables a space between the load gear 31 and the large-diameter gear 61 to be enlarged. In this case as well, in a case in which the load gear 31 is rotated, a mechanical loss generated by viscosity of the machine oil (grease) can be reduced, and fluidity of the machine oil (grease) can be improved at the time of rotation of the load gear 31.

Meanwhile, the load gear 31, the speed reducing gear member 60, and a pinion gear 72 correspond to a gear member.

Also, the load sheave hollow shaft 20 has a pair of flange portions 23*a* constituting a load sheave 23 and further has between the flange portions 23*a* as the pair a chain pocket 23*b* (refer to FIG. 4) constituting the load sheave 23. The chain pocket 23*b* is a part in which a metal ring C1*a* of a load chain C1 is fitted and has a horizontal pocket (not illustrated) in which the metal ring C1*a* is fitted in a state in which a direction in which the metal ring C1*a* is flat is parallel to the axial direction (X direction) and a vertical pocket (not illustrated) which is in a deeper groove shape than the horizontal pocket and in which the metal ring C1*a* is fitted in a state in which the direction in which the metal ring C1*a* is flat intersects with the axial direction (X direction).

Here, in the present embodiment, a balance between hardness of the load chain C1 and hardness of the load sheave 23 is optimized. Hereinbelow, details thereof will be described.

First, strength and hardness of a load chain and hardness of a load sheave in a conventional chain block will be described. The Rockwell hardness C scale (HRC) employed in the conventional chain block is 45 or higher, and the Rockwell hardness C scale (HRC) of the load sheave is 40 to 45.

On the other hand, relation between the hardness of the load chain C1 and the hardness of the load sheave 23 in the present embodiment is shown in Table 1 below.

TABLE 1

| | Member | Hardness (HRC) | Abrasion amount of load chain |
|---|---|---|---|
| Example 1 | Load chain | 47 to 51 | Small |
| | Load sheave | 40 to 45 | |
| Comparative Example 1 | Load chain | 47 to 51 | Large |
| | Load sheave | 48 | |

As shown in Table 1, in Example 1, the Rockwell hardness C scale (HRC) of the load chain C1 is about 48. Meanwhile, the Rockwell hardness C scale (HRC) of the load chain C1 has only to be 47 to 51. Also, in the present embodiment, the hardness of the load sheave 23 is lower than that of the load chain C1. Specifically, the Rockwell hardness C scale (HRC) of the load sheave 23 is about 40 to 45. At this time, in an abrasion accelerating test in which a three-ton load is applied to the load chain C1 having a diameter of 6.3 mm, the load chain C1 was wound up and down as much as a predetermined distance, and the abrasion amount was measured. As a result, the abrasion amount of the load chain C1 was 0.1 mm, which was determined to be small. It is to be noted that, in this test, the abrasion amount is determined to be small when the abrasion amount of the load chain C1 is 0.2 mm or less, the abrasion amount is determined to be middle when the abrasion amount of the load chain C1 is 0.2 to 0.6 mm, and the abrasion amount is determined to be large when the abrasion amount of the load chain C1 is 0.6 mm or more.

On the other hand, in Comparative Example 1 in Table 1, the Rockwell hardness C scale (HRC) of the load chain C1 is about 48, which is similar to one in Example 1, and has only to be 47 to 51. Also, in Comparative Example 1, the Rockwell hardness C scale (HRC) of the load sheave 23 is about 48. At this time, the abrasion amount was measured under similar conditions to those of the above test. As a result, the abrasion amount of the load chain C1 under the similar conditions to those of Example 1 was 1.7 mm, which was determined to be large.

It was found from the result that the abrasion amounts of the load chain C1 and the load sheave 23 were large when the Rockwell hardness C scale (HRC) of the load chain C1 was 47 to 51, and the hardness of the load sheave 23 was comparable. However, when the Rockwell hardness C scale (HRC) of the load sheave 23 was lowered to 40 to 45 without changing the hardness of the load chain C1, the abrasion amount of the load chain C1 significantly decreased.

Meanwhile, the load chain C1 is produced to have uniform (or substantially uniform) hardness on the entire cross-section thereof by thermal refining in which quenching and tempering are combined. That is, the load chain C1 according to the present embodiment is a quenched and tempered chain. Due to the tempering in the thermal refining, the load chain C1 does not lose viscosity and has a similar level of viscosity to that of the conventional load chain.

Figure 7:
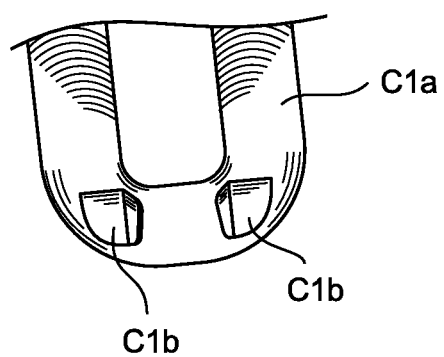
FIG. 7 is a partial perspective view illustrating an abrasion state of a metal ring of a load chain.

Conversely, there is an idea in which, while only a surface of the load chain is hardened by means of fine carburizing or the like, an inside of the load chain is not hardened to have similar hardness to that of the load sheave. However, this case has the following problem. That is, as illustrated in FIG. 7, the metal ring C1a of the load chain C1 is normally abraded so that specific parts thereof may be bored (hereinbelow, the specific part is referred to as an uneven abrasion part C1b). In a case in which such a load chain C1 is subject to the uneven abrasion, a hard layer on the surface will be removed at the abraded part, and thus abrasion will progress more easily at the part. In this case, the strength of the load chain will decrease significantly. On the other hand, in the case in which the hardness is uniform (or substantially uniform) on the entire cross-section of the load chain C1 as in the present embodiment, it is possible to prevent the strength of the load chain C1 from decreasing significantly.

Meanwhile, when the hardness is compared among the respective members, the comparison is expressed by Inequality 1 and Inequality 2 below.

Auxiliary plate 50 having bearing holes 57>Load chain C1>Load sheave 23>First frame 11 and Second frame 12     (Inequality 1)

Bearings B1,B2>Load chain C1>Load sheave 23>First frame 11 and Second frame 12     (Inequality 2)

Also, the load sheave hollow shaft 20 is provided with a hollow hole 24. A drive shaft 70 is inserted in the hollow hole 24, and at an end portion of the hollow hole 24 on a side of the second frame 12 is provided a bearing step 26 adapted to receive a bearing B3 pivotally supporting the drive shaft 70. At an end portion of the hollow hole 24 on a side of the gear fitting portion 22 is provided a housing recess 27 adapted to receive a flange portion 71 of the drive shaft 70. Situating the flange portion 71 of the drive shaft 70 in this housing recess 27 shortens a length of the drive shaft 70 along the axial direction (X direction) and can reduce a dimension of the chain block 10 along the X direction (axial direction of the drive shaft 70). Also, shortening the chain block 10 along the axial direction of the drive shaft 70 enables strength of the drive shaft 70 to be improved.

As illustrated in FIGS. 1 to 6, the upper hook 40 is attached to the first frame 11 and the second frame 12 via a connection shaft 41 (refer to FIGS. 6 and 9) and is attached to the connection shaft 41 in a turnable state. To this upper hook 40 is attached a hook latch 40a biased in a closing direction by a not-illustrated biasing means.

Figure 2:
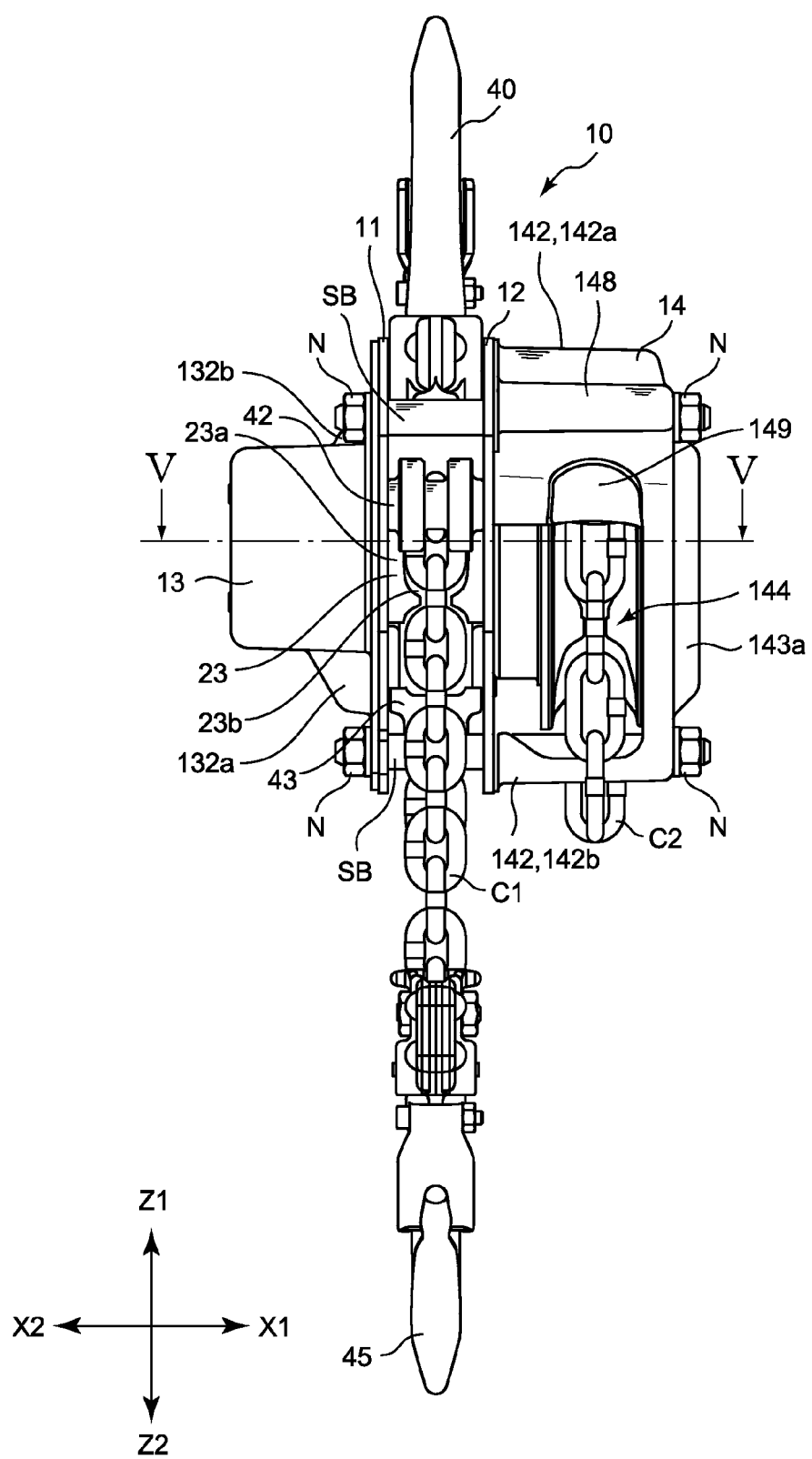
FIG. 2 is a side view illustrating the appearance of the chain block in FIG. 1.

Each of the guide rollers 42 illustrated in FIGS. 2 and 9 is rotatably pivotally supported at one end side and the other end side thereof by the first frame 11 and the second frame 12, and in an example, the guide rollers 42 are provided as a pair at intervals of 180 degrees with a center of the load sheave hollow shaft 20 interposed therebetween. Each of these guide rollers 42 is a member which is rotated along with upward winding or the like of the load chain C1 and is attached to be opposed to the load sheave 23 away from a distance preventing the load chain C1 from coming off of the chain pocket 23b.

The fastener 43 illustrated in FIGS. 1, and 9 to 11 is a part to which is attached a metal pin 43a (refer to FIGS. 1 and 11) to be inserted in the metal ring C1a of the load chain C1 at an opposite end of a side to which a lower hook 45 is attached. This fastener 43 is rotatably pivotally supported at one end side and the other end side thereof by the first frame 11 and the second frame 12 as well.

Figure 10A:
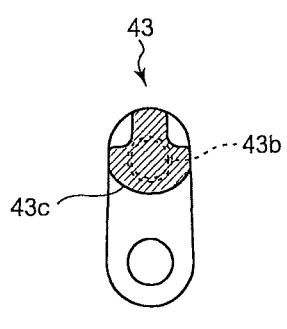
FIGS. 10(A) and 10(B) illustrate a configuration of a fastener in the chain block in FIG. 1.
Figure 10B:
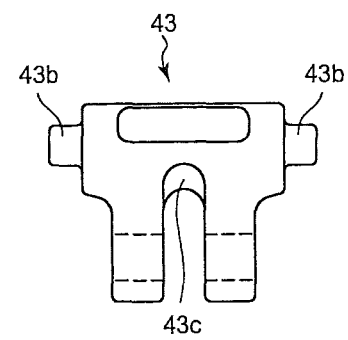

As illustrated in FIG. 10(B), the fastener 43 includes a boss portion 43b and is turnably supported in respective catching holes 11d and 12d (refer to FIGS. 1, 6, 11, 17(A), and 17(B)) of the first frame 11 and the second frame 12 via this boss portion 43b. The fastener 43 is also provided with an escape portion 43c illustrated in FIGS. 10(A) and 10(B). The escape portion 43c has a cross-section thereof formed in a curved shape to let the load chain C1 guided to a side of the load sheave 23 in a favorable manner.

Meanwhile, in a conventional fastener 43P illustrated in FIG. 12, an escape portion 43Pc has a cross-section thereof formed in a linear shape, not a curved shape. Thus, in order for the metal pin 43a of the fastener 43P to swing to face to the side of the load sheave 23 in a case in which excessive downward winding occurs, a dimension between the metal pin and the boss portion 43b needs to be equal to or larger than a predetermined dimension. However, in the present embodiment, since the escape portion 43c employs the curved shape, the dimension between the metal pin 43a and the boss portion 43b can be reduced, which can achieve size reduction of the entire chain block 10.

Also, in the present embodiment, a size of the fastener 43 is set to make the fastener 43 impossible to pass through between the load sheave 23 and the guide roller 42. In addition, a safety ratio of the boss portion 43b is set to be lower than a safety ratio of the metal pin 43a. In other words, strength is set so that breakage of the fastener 43 may occur earlier in the boss portion 43b than in the metal pin 43a. For example, the safety ratio of the metal pin 43a is set to be higher by about 0.5 than the safety ratio of the boss portion 43b. However, the difference of the safety ratio of the metal pin 43a from the safety ratio of the boss portion 43b may be any value.

This configuration has the following merit. In a case of an opposite configuration of the present embodiment in which the metal pin 43a is broken earlier than the boss portion 43b, a load hung on the load chain C1 will drop suddenly due to the breakage. This case can lead to an accident. However, as in the present embodiment, in a case of the configuration in which the boss portion 43b is broken earlier than the metal pin 43a, even when a load hung on the load chain C1 is about to drop suddenly due to the breakage, the fastener 43 gets stuck between the load sheave 23 and the guide roller 42, and it is possible to prevent the load from dropping further. Accordingly, it is possible to prevent the accident caused by breakage of the fastener 43.

As described above, in the fastener 43, the safety ratio of the boss portion 43b to be supported in the first frame 11 and the second frame 12 is set to be lower than that of the metal pin 43a (pin member). Also, in the fastener 43, the escape portion 43c that guides sliding of the metal ring of the load chain C1 is formed in a curved shape.

The stripper 44 illustrated in FIG. 4 is a member which prevents generation of a lock state, in which the load chain C1 wound around the load sheave 23 follows the load sheave 23 more than necessary to disable rotation of the load sheave 23. Respective end portions of this stripper 44 on one end side and the other end side are inserted in respective support holes 11b and 12b residing in the first frame 11 and the second frame 12 to cause the stripper 44 to be attached to the first frame 11 and the second frame 12.

Here, as illustrated in FIG. 9, the stripper 44 is provided with an inclined portion 44a and is further provided with an inclined portion 44c with a straight portion 44b connected to the inclined portion 44a interposed between the inclined portion 44a and the inclined portion 44c. Thus, guiding performance of the load chain C1 on an unloaded side on which no load is hung becomes favorable. That is, a conventional stripper 44P does not include the lower side inclined portion 44c but just a long straight portion 44Pb as illustrated in FIG. 13. Thus, at an edge on a lower side of the straight portion 44Pb, there is a case in which the metal rings C1a of the load chain C1 get jammed and stuck.

In particular, in the present embodiment, the size of the chain block 10 is reduced, but since an outside diameter of the bearing of the load sheave 23 is determined by the load, an attaching position of the stripper 44 is not much different from a conventional position before the size reduction. Thus, in a case in which the chain block 10 is inclined, centering on the connection shaft 41, the load chain C1 will hit the stripper 44 easily. However, the stripper 44 according to the present embodiment is provided with the inclined portion 44c, and thus even when a length of the load chain C1 that has been separated from the load sheave 23 gets longer, the metal rings C1a do not get jammed on the stripper 44, and the stripper 44 can guide the metal rings C1a to be hung down favorably.

Meanwhile, the straight portion 44b is provided to prevent the edge on the lower side of the stripper 44 from being formed at an acute angle. In particular, further on sides of the first frame 11 and the second frame 12 than the cross-sectional view in FIG. 9, the inclined portion 44c is located further on a lower side. Thus, in a case in which no straight portion 44b exists, the edge on the lower side may be pointed. By providing the straight portion 44b, it is possible to prevent such a pointed part from existing. Nevertheless, a configuration in which the inclined portion 44a and the inclined portion 44c are integrated may be employed without providing the straight portion 44b.

As described above, at least a side surface of the stripper 44 on a side on which the load of the load chain C1 is not hung is provided with the inclined portion 44c that is inclined in a direction from the lower side (Z2 side) to the upper side (Z1 side) and, in an unloaded state, in a direction of heading for an outer circumferential side of the load sheave 23 as the inclined portion 44c is further on the upper side (Z1 side) in the up-down direction. Also, the inclined portion 44c is provided with the straight portion 44b that is parallel to the up-down direction in the unloaded state and is also provided further on the upper side (Z1 side) than the straight portion 44b with the inclined portion 44a that is inclined, in an unloaded state, in the direction of heading for the outer circumferential side of the load sheave 23 as the inclined portion 44c is further on the upper side (Z1 side) in the up-down direction.

Figure 3:
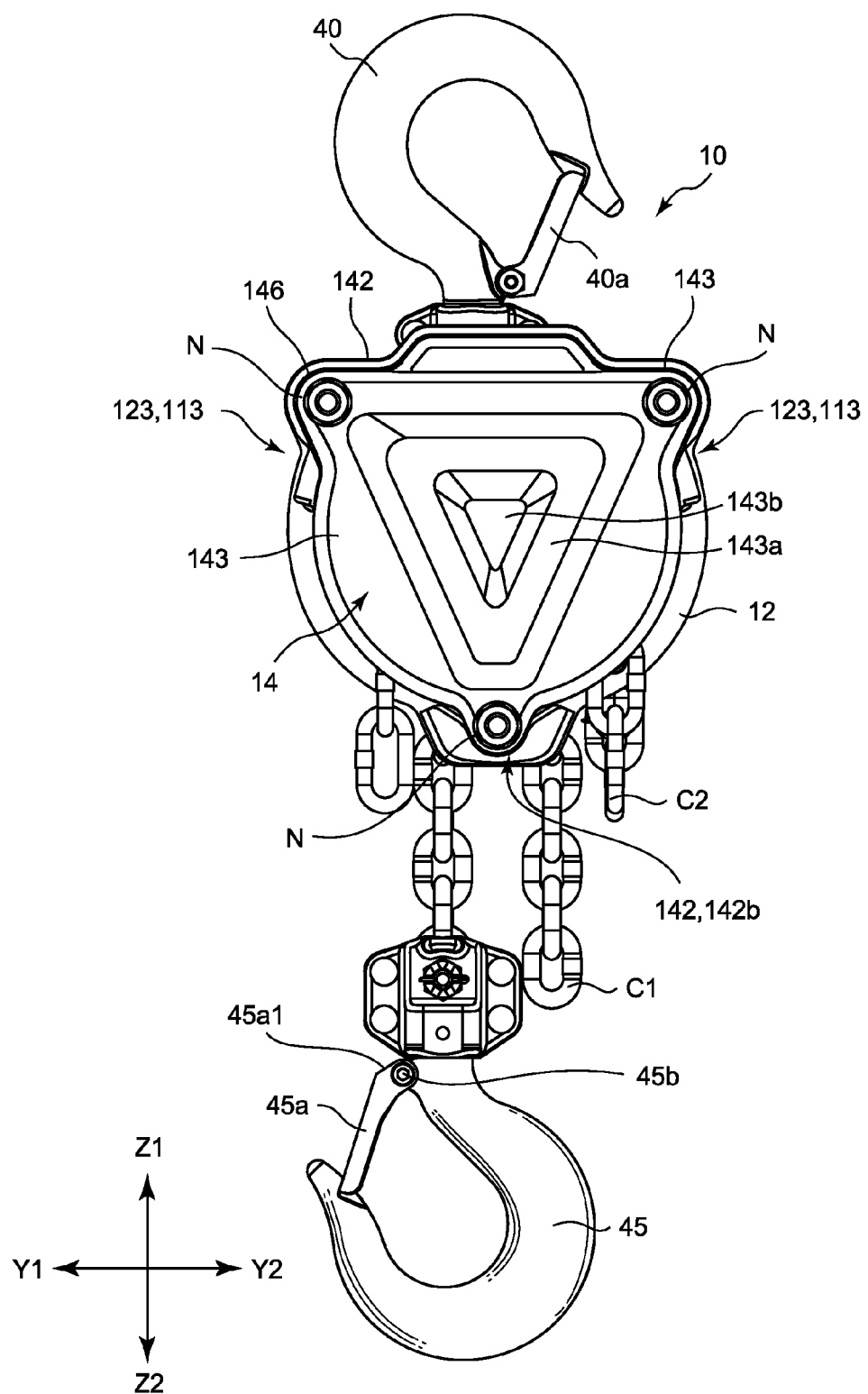
FIG. 3 is a rear view illustrating the appearance of the chain block in FIG. 1.

The lower hook 45 illustrated in FIGS. 1 and 3 is a part on which the load is hung and is attached on an end side of the load chain C1 on an opposite side of a side to which the fastener 43 is attached. This lower hook 45 is provided with a lever 45a adapted to prevent the load hung on the lower hook 45 from coming off. The lever 45a has one end side thereof located on the upper side (Z1 side) and is provided to be turnable, centering on a turning shaft 45b on one end side thereof. Also, the other end side of the lever 45a is located on the lower side (Z2 side) and is provided to abut on an inner circumference on a tip end side of the lower hook 45.

This lever 45a is provided so that the other end side may abut on the inner circumference on the tip end side of the lower hook 45 at all times due to the action of a biasing force of a not-illustrated spring. Accordingly, in a state in which no external force acts on the lever 45a, the lever 45a can be kept in a closed state, and it is possible to prevent the lever 45a from opening and prevent the load from falling.

Figure 14:
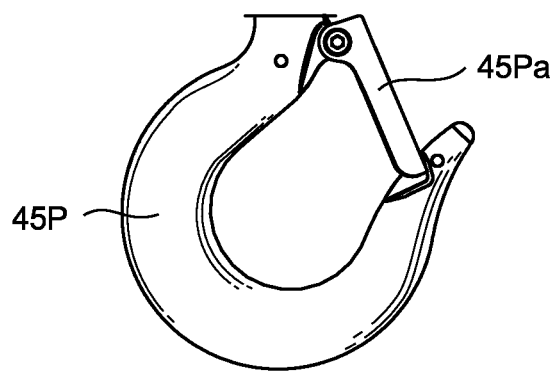
FIG. 14 is a partial side view illustrating a configuration of a conventional lower hook.

Here, as illustrated in FIGS. 1 and 3, an inclined portion 45a1 is provided on one end side of the lever 45a. Conversely, in a lever 45Pa of a conventional lower hook 45P illustrated in FIG. 14, no such inclined portion 45a1 is provided. This case has the following problem. That is, in a case in which the lower hook 45P is wound up excessively to cause the lower hook 45P to go between the first frame 11 and the second frame 12, one end side of the lever 45Pa may hit another member to cause the lever 45Pa to open, depending on the direction of the lower hook 45P. In this case, the load may fall.

However, in the present embodiment, one end side of the lever 45a is provided with the inclined portion 45a1 that is inclined to proceed to the lower side (Z2 side) from one end portion to the other end portion of the lever 45a at the time of hanging the load. Also, this inclined portion 45a1 is provided at thirty degrees or more with respect to the Y direction along which a border part of a base 45c of the lower hook 45 illustrated in FIGS. 1 and 3 goes.

Accordingly, even when the lower hook 45 is wound up excessively, and the inclined portion 45a1 is about to hit another member, rotation of the lower hook 45 can be generated, and the lever 45a can escape.

Figure 8A:
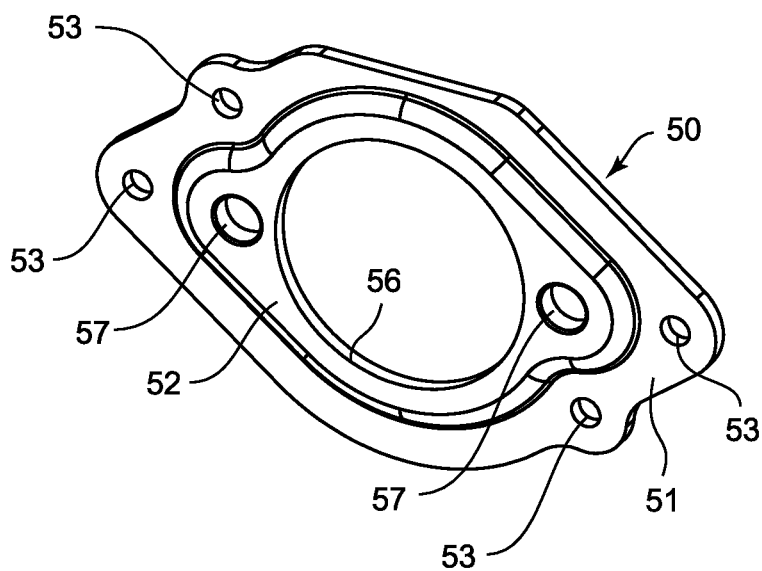
FIGS. 8(A) and 8(B) are perspective views illustrating a shape of the auxiliary plate in the chain block in FIG. 1.
Figure 8B:
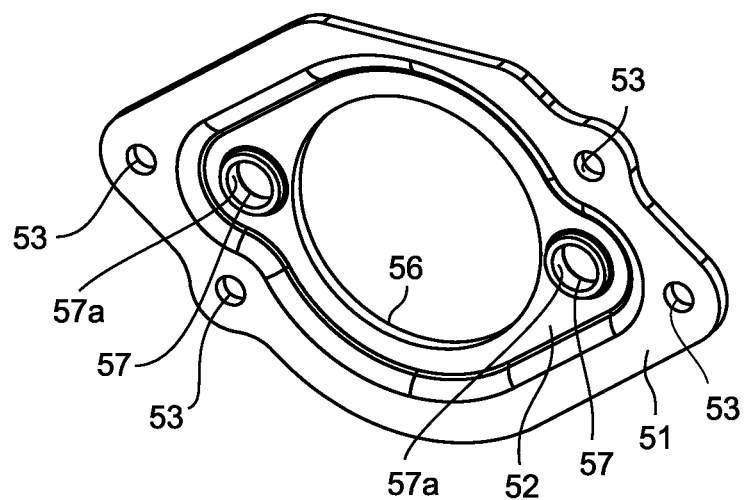

Also, as illustrated in FIGS. 4 to 6, to an end surface of the first frame 11 on a side opposed to the gear case 13 is attached an auxiliary plate 50 illustrated in FIGS. 8(A) and 8(B). The auxiliary plate 50 is provided with a flange portion 51 and a draw portion 52. The flange portion 51 is a part which contacts the end surface of the first frame 11 and is provided with fixing holes 53. By inserting fixing tools 55 (refer to FIG. 5) such as rivets into the fixing holes 53 and attaching holes 11c provided in the first frame 11, the auxiliary plate 50 is attached to the first frame 11. Also, the draw portion 52 is a part situated further on a center side than the flange portion 51 and is a part formed by means of drawing, for example, so that a center side of the auxiliary plate 50 may be spaced apart from the end surface of the first frame 11 over a predetermined distance. In the present embodiment, the draw portion 52 has recessed portions exist on an outer circumferential side thereof due to existence of the fixing holes 53 but is formed approximately in a rhombus shape with rounded corners except the recessed portions in the configuration illustrated in FIGS. 6, 8(A), and 8(B).

Here, attaching positions of the aforementioned fixing tools 55 and the guide rollers 42 to the first frame 11 have positional relationship as illustrated in FIG. 9. That is, the guide rollers 42 as the pair are attached proximately to any fixing tools 55, respectively, and are arranged at symmetric positions with a center between the guide rollers 42 interposed therebetween. Also, each of the guide rollers 42 is provided proximately to the fixing tool 55 (55a) which is further away from a rotation center of the load sheave 23 and the like and provided at a position spaced apart from the fixing tool 55 (55b) which is closer to the center with the Y direction interposed therebetween. By adopting such arrangement, when the load chain C1 is wound up, the entire chain block 10 intends to turn along a turning direction M in FIG. 9 so that a force F applied by the load chain C1 is directed perpendicularly to a line L connecting the fixing tools 55 which are proximate to each other. In a case of arrangement of the guide rollers 42 as illustrated in FIG. 9, at the time of such turning, a line connecting the guide rollers 42 as the pair is in a nearly horizontal state, which enables guiding performance for the load chain to be maintained favorably.

Also, as illustrated in FIGS. 6, 8(A), and 8(B), on a center side of the draw portion 52 is provided a center hole 56. The center hole 56 is provided coaxially with the aforementioned insertion hole 11a and has a similar diameter to that of the insertion hole 11a. The aforementioned bearing B1 is situated in the center hole 56 to support the load sheave hollow shaft 20. The draw portion 52 is also provided with bearing holes 57 along a longer diagonal line thereof formed approximately in a rhombus shape. The bearing holes 57 are provided as a pair, for example, at positions equally distant from a center of the center hole 56 and are formed in shapes each having an erecting portion 57a by means of burring, for example. Each of these bearing holes 57 has a pivotally supporting portion 63 of the speed reducing gear member 60 on one end side (X1 side in FIG. 5) inserted therein to pivotally support the speed reducing gear member 60. Meanwhile, a pivotally supporting portion 64 of the speed reducing gear member 60 on the other end side (X2 side in FIG. 5) is inserted in a bearing hole 13a of the gear case 13 via a bearing B4 such as a bush, and the speed reducing gear member 60 is pivotally supported by the bearing hole 13a.

Figure 15A:
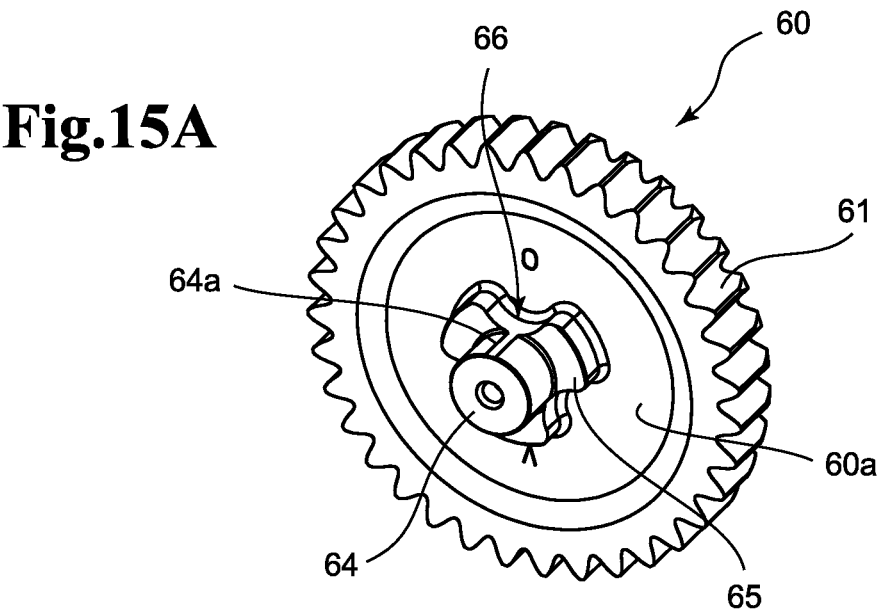
FIGS. 15(A) and 15(B) are perspective views illustrating a shape of the speed reducing gear member in the chain block in FIG. 1.
Figure 15B:
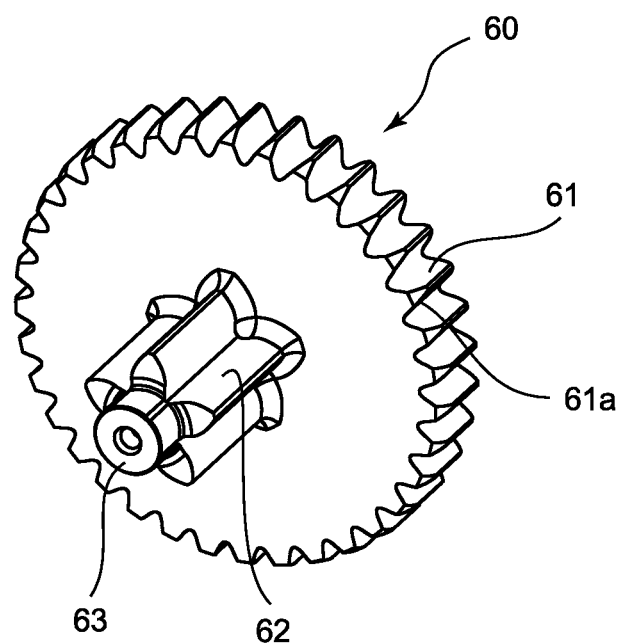

As illustrated in FIGS. 5, 15(A), and 15(B), each of the speed reducing gear members 60 as a pair (arrangement of the pair of speed reducing gear members 60 is illustrated in FIG. 11 as well) is provided with the large-diameter gear 61 (corresponding to a first speed reducing gear portion) and a small-diameter gear 62 (corresponding to a second speed reducing gear portion) and is further provided with the pivotally supporting portion 63 to be inserted into the aforementioned bearing hole 57 and the pivotally supporting portion 64 to be inserted into the bearing hole 13a. The large-diameter gear 61 meshes with a pinion gear 72 of the drive shaft 70, and a drive force from the drive shaft 70 is transmitted to the speed reducing gear member 60 at a first speed reducing ratio. Also, the large-diameter gear 61 is provided with a chamfered portion 61a. The chamfered portion 61a is provided at a part of an outer circumferential side of the large-diameter gear 61 on the X1 side and is provided to have a smaller diameter than those of the other parts of the large-diameter gear 61. Existence of this chamfered portion 61a prevents the large-diameter gear 61 from interfering with an inclined portion 73 and a curved portion 74 of the drive shaft 70.

Also, the small-diameter gear 62 meshes with the load gear 31 and transmits the drive force transmitted to the speed reducing gear member 60 to the load gear 31 at a second speed reducing ratio. Meanwhile, this small-diameter gear 62 and the aforementioned large-diameter gear 61 are integrally formed by means of cold forging, for example. However, the small-diameter gear 62 and the large-diameter gear 61 may be integrally formed by means of combination of other processes such as precision forging and cutting or may be formed by forming them separately by means of combination of the above processes and then connecting them.

As illustrated in FIG. 15(A), further on a side (X1 side) of the large-diameter gear 61 than the pivotally supporting portion 64 in the speed reducing gear member 60 are provided expanding portions 65. The expanding portions 65 are provided in a recess 60a provided at a center part on an end surface of the speed reducing gear member 60. These expanding portions 65 are parts expanding outward in the radial direction so as to have larger diameters than that of the pivotally supporting portion 64 and expand intermittently along the circumferential direction (in FIG. 15(A), three expanding portions 65 are provided). Between the adjacent expanding portions 65 is provided a dented portion 66 having a relatively smaller diameter than that of the expanding portion 65. Also, on an outer circumferential side of the pivotally supporting portion 64 is provided an oil groove 64a along the axial direction (X direction) of the speed reducing gear member 60, and this oil groove 64a communicates with any of the dented portions 66. This enables the machine oil (grease) to be supplied to the bearing B4 such as a bush via the recess 60a and the oil groove 64a. Also, existence of the aforementioned expanding portions 65 enables the large-diameter gear 61 to be away from the bearing B4, and existence of the recess 60a and the oil groove 64a enables a mechanical loss generated by viscosity of the machine oil (grease) to be reduced and enables fluidity of the machine oil (grease) to be improved between the large-diameter gear 61 and the bearing B4 or B5.

Figure 16A:
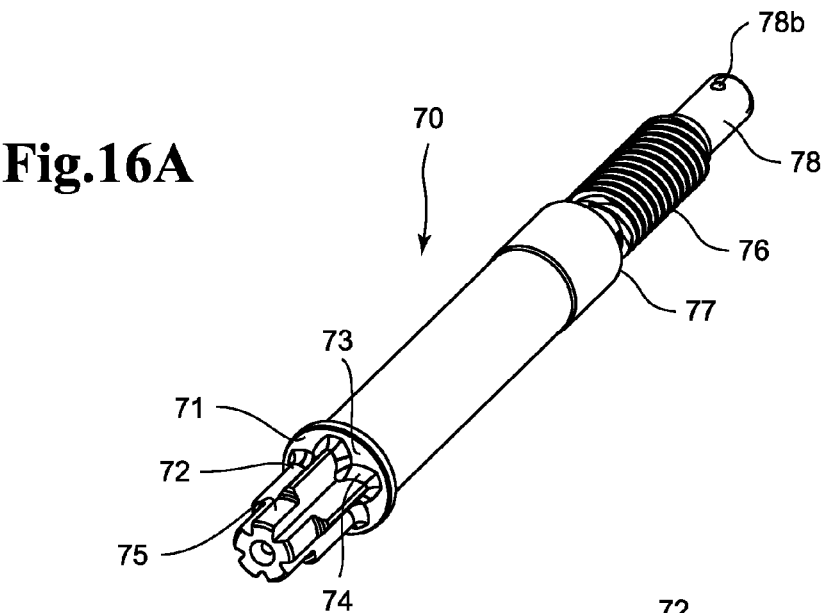
FIGS. 16(A), 16(B), and 16(C) illustrate a shape of a drive shaft in the chain block in FIG. 1.
Figure 16B:
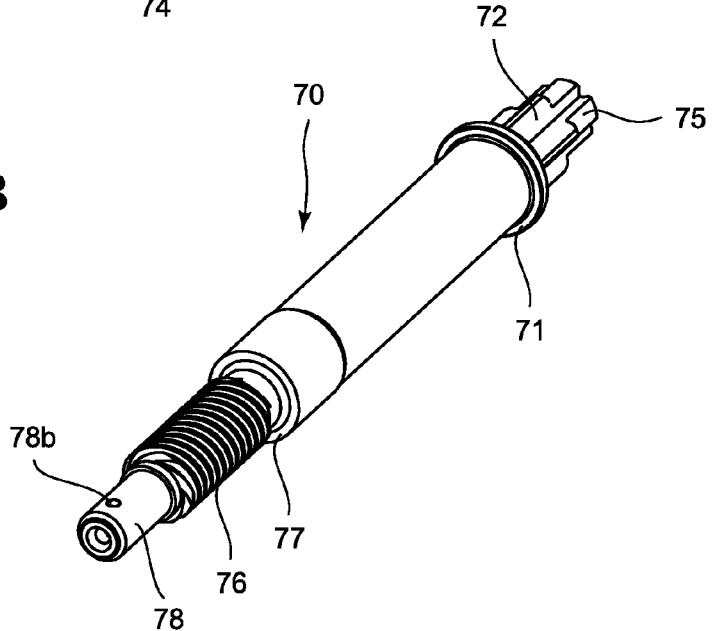
Figure 16C:
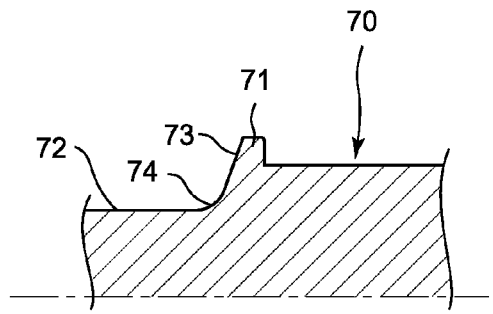

As illustrated in FIGS. 4 and 5, the drive shaft 70 (refer to FIGS. 16(A) to 16(C)) is a member extending from a side of the gear case 13 to a side of a hand wheel 80 along the X direction. This drive shaft 70 passes through the hollow hole 24 of the load sheave hollow shaft 20 as described above and is provided to be rotatable with respect to the load sheave 23 via the bearing B3 of the bearing step 26. The drive shaft 70 is also provided with the flange portion 71, and this flange portion 71 is situated in the housing recess 27. The flange portion 71 is received in a bottom portion 27a of the housing recess 27 to regulate movement of the drive shaft 70 to the side of the hand wheel 80 and enable a dimension of the drive shaft 70 in the axial direction to be reduced.

Figure 17A:
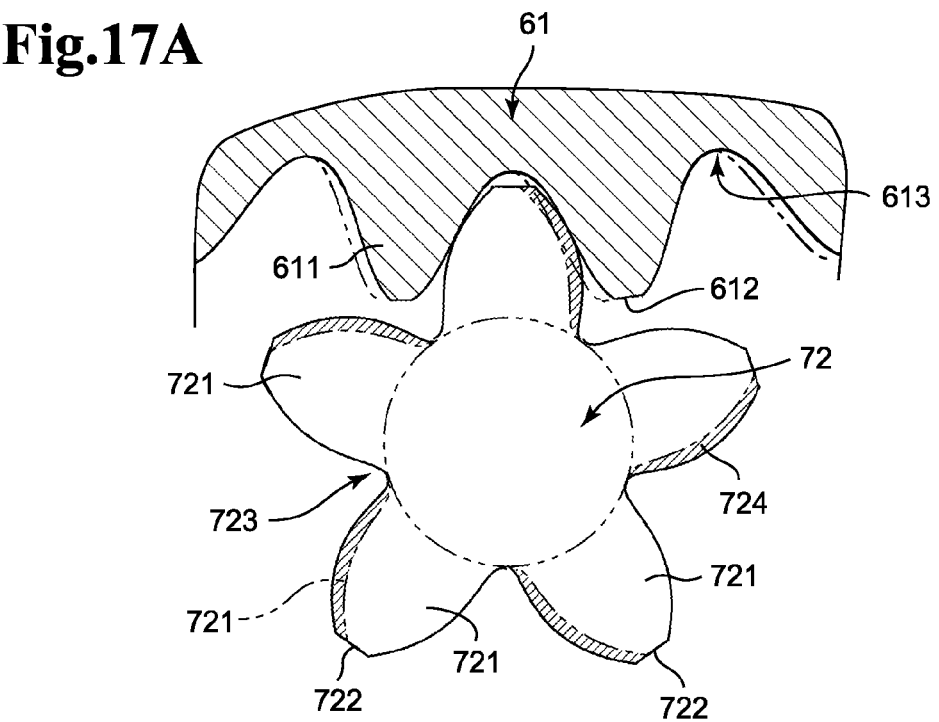
FIG. 17(A) illustrates a meshing state of a pinion gear with a large-diameter gear in the present embodiment.
Figure 17B:
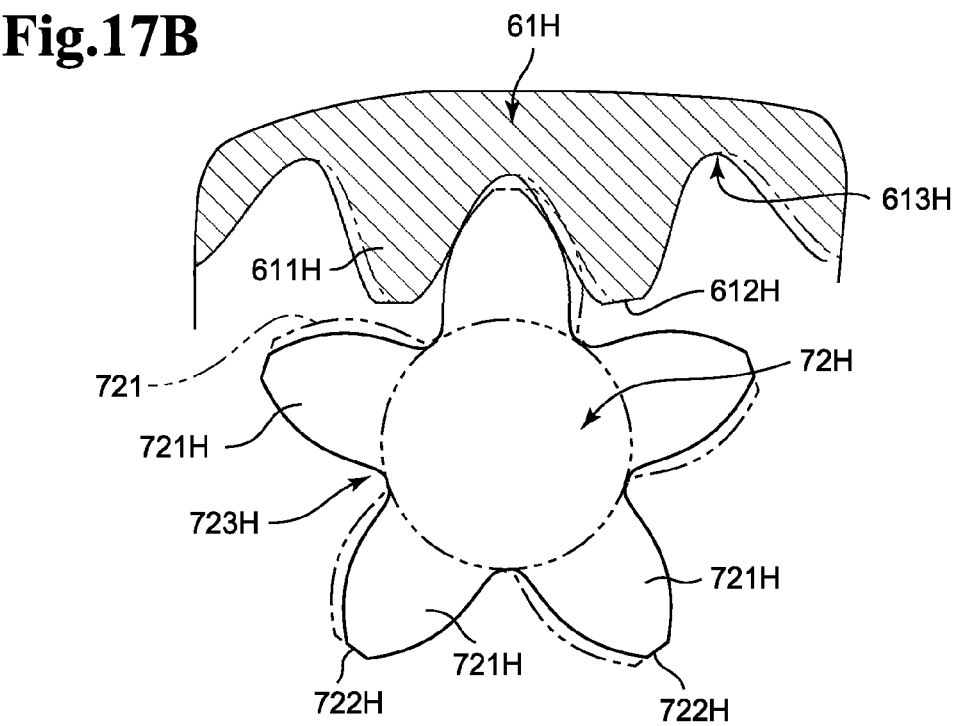
FIG. 17(B) illustrates a meshing state of a pinion gear with a large-diameter gear in a conventional configuration.

At a part of this drive shaft 70 projecting from the hollow hole 24 to the side of the gear case 13 (X2 side) is provided the pinion gear 72 (corresponding to a first gear) meshing with the aforementioned large-diameter gear 61. In FIG. 17(A), the pinion gear 72 has five teeth 721. A tooth thickness Da of each tooth 721 of this pinion gear 72 is set to differ from a tooth thickness Db of a tooth 721H of a conventional pinion gear 72H as illustrated in FIG. 18(B). That is, in the pinion gear 72 according to the present embodiment, the tooth thickness Da (hereinbelow, the tooth thickness Da of a tooth tip 722 is referred to as a tooth thickness Da2 as illustrated in FIG. 18(A)) of the tooth tip 722 of each tooth 721 is set to be larger than the tooth thickness Db (hereinbelow, the tooth thickness Db of a tooth tip 722H is referred to as a tooth thickness Db2 as illustrated in FIG. 18(B)) of the tooth tip 722H of each tooth 721H.

Meanwhile, in the case in which the tooth thickness Da2 of the tooth tip 722 is set to be larger than the tooth thickness Db2 of the conventional tooth tip 722H as described above, the tooth thickness Da of each tooth 721 can be as follows. That is, in the pinion gear 72 according to the present embodiment, a dimension Ba (not illustrated) of a tooth bottom 723 residing between the adjacent teeth 721 is set to be smaller than a dimension Bb (not illustrated) of a tooth bottom 723H of the conventional pinion gear 72H. Thus, on a side of the tooth bottom 723, the tooth thickness Da (hereinbelow, the tooth thickness Da on the side of the tooth bottom 723 is referred to as a tooth thickness Da1 as illustrated in FIG. 18(A)) of the tooth 721 is set to be larger than the tooth thickness Db (hereinbelow, the tooth thickness Db on the side of the tooth bottom 723 is referred to as a tooth thickness Db1 as illustrated in FIG. 18(B)) of the conventional tooth 721.

Figure 18A:
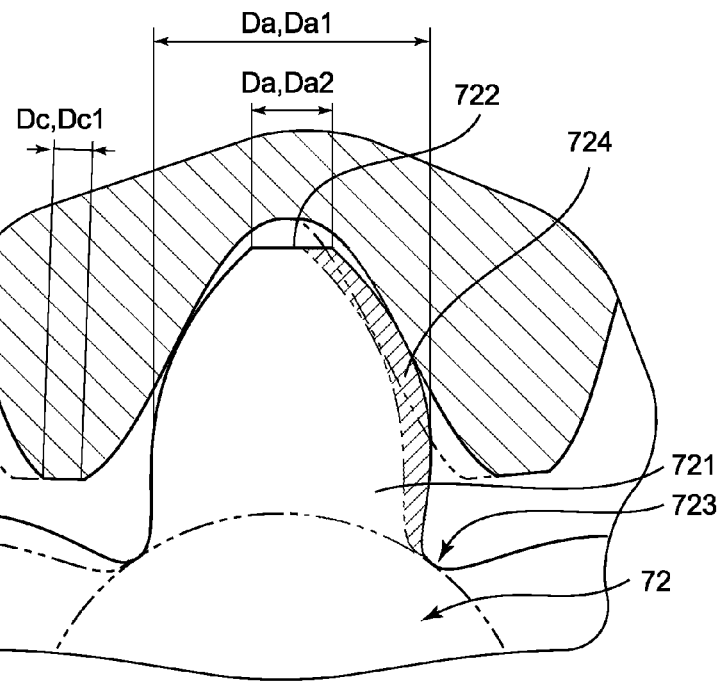
FIG. 18(A) illustrates relationship of tooth thicknesses of the pinion gear and the large-diameter gear in the present embodiment.
Figure 18B:
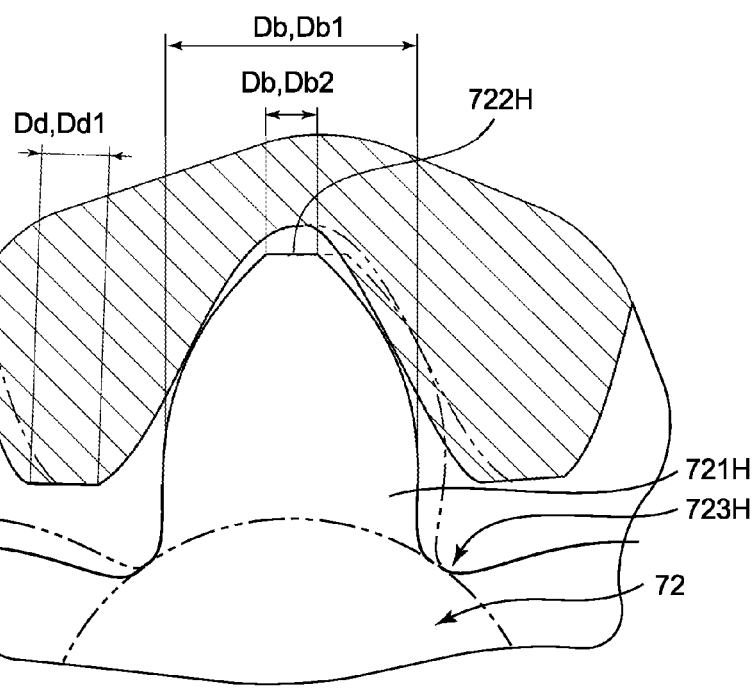
FIG. 18(B) illustrates relationship of tooth thicknesses of the pinion gear and the large-diameter gear in the conventional configuration.

In addition, as illustrated in FIGS. 18(A) and 18(B), the tooth thicknesses Da and Db at respective parts of the teeth 721 and 721H are considered. In this case, in the configuration illustrated in FIG. 18(A), the ratio of a thickened portion 724 in the tooth thickness Da of the tooth 721 in the present embodiment is set to increase from the side of the tooth bottom 723 to a side of the tooth tip 722, as compared with the tooth thickness Db of the conventional tooth 721H. Accordingly, since the ratio of the thickened portion 724 is larger on the side of the tooth tip 722, strength of the tooth 721 on the side of the tooth tip 722 can be improved significantly.

It is to be noted that the tooth thickness Da of each tooth 721 may be set as follows. That is, the tooth thickness Da1 on the side of the tooth bottom 723 may be set to be approximately equal to the tooth thickness Db1 of the conventional tooth 721H on the side of the tooth bottom 723H. However, in this case, it is necessary to prevent undercut from being generated on the side of the tooth bottom 723. It is to be noted that, in the case in which the tooth thickness Da1 on the side of the tooth bottom 723 is set to be approximately equal to the tooth thickness Db1 of the conventional tooth 721H on the side of the tooth bottom 723H as described above, a dimension of the thickened portion 724 may be set to increase from the tooth bottom 723 to the tooth tip 722.

Also, each tooth 611 of the large-diameter gear 61 meshing with the aforementioned pinion gear 72 is thinned to the extent of thickening of the thickened portion 724 of the tooth 721. That is, in the large-diameter gear 61, a tooth thickness Dc (refer to FIG. 18(A)) of the tooth 611 is smaller than a tooth thickness Dd (refer to FIG. 18(D)) of a conventional tooth 611H as much as the increasing amount from the tooth thickness Db of the tooth 721H of the conventional pinion gear 72H to the tooth thickness Da of the tooth 721 of the pinion gear 72. At this time, the tooth thickness Da2 of the tooth tip 722 of the pinion gear 72 is set to be larger than a tooth thickness Dc1 of a tooth tip 612 of the large-diameter gear 61. Here, as for a part at which the tooth 721 and the tooth 611 contact each other, the changing amount of the tooth thickness Da (thickened portion 724) of the tooth 721 in the pinion gear 72 from the side of the tooth bottom 723 to the side of the tooth tip 722 corresponds to the changing amount of the tooth thickness Dc of the tooth 611 in the large-diameter gear 61 from a side of the tooth tip 612 to a side of a tooth bottom 613. This achieves favorable mesh between the pinion gear 72 and the large-diameter gear 61.

Meanwhile, in the configuration illustrated in FIGS. 17(A), 17(B), 18(A), and 18(B), the pinion gear 72 is provided with the five teeth 721 while the large-diameter gear 61 is provided with the thirty five teeth 611. Also, the large-diameter gears 61 as a pair (speed reducing gear members 60) are arranged at symmetric positions with the pinion gear 72 interposed therebetween, and the pinion gear 72 meshes with both the large-diameter gears 61 as the pair. Accordingly, when the teeth 611 of the large-diameter gear 61 are rotated once, the teeth 611 of the large-diameter gear 61 contact the teeth 721 of the pinion gear 72 only once, and the teeth 721 of the pinion gear 72 contact the teeth 611 of the large-diameter gear 61 fourteen times during each rotation of the large-diameter gear 61.

Also, each of the speed reducing gear member 60 and the drive shaft 70 is made of a metal and is preferably made of an iron-based metal from a viewpoint of abrasion resistance. Also, the speed reducing gear member 60 and the drive shaft 70 are preferably made of similar materials. However, at least the pinion gear 72 out of the drive shaft 70 may be made of a material more excellent in abrasion resistance than that of the large-diameter gear 61 of the speed reducing gear member 60.

At the part of the drive shaft 70 projecting from the hollow hole 24 to the side of the gear case 13 (X2 side) is provided the pinion gear 72 (corresponding to a gear portion) meshing with the aforementioned large-diameter gear 61. As illustrated in FIGS. 16(A) and 16(C), at a base end part in the pinion gear 72 with respect to the flange portion 71 is provided the inclined portion 73. Further, between the respective teeth of the pinion gear 72 and the inclined portion 73 is provided the predetermined curved portion 74. The curved portion 74 is formed in a round shape, for example. Existence of the inclined portion 73 and curved portion 74 can prevent stress concentration from being generated on a border part of the pinion gear 72 and the flange portion 71. It is to be noted that the curved portion 74 has only to be 1/10 or larger of the inclined portion 73, and by setting the ratio thereof in the inclined portion 73 to 1/10 or larger, the stress concentration can be prevented favorably.

Here, the tooth thickness on the tip end side of the tooth of the pinion gear 72 is set to be larger than the tooth thickness on the tip end side of the large-diameter gear 61 meshing with the pinion gear 72. Accordingly, lifetime of the pinion gear 72 can be extended. That is, since the number of teeth of the pinion gear 72 is smaller than the number of teeth of the large-diameter gear 61, the number of times of sliding of the respective teeth of the pinion gear 72 is larger than that of the respective teeth of the large-diameter gear 61. Thus, the respective teeth of the pinion gear 72 are abraded earlier than the respective teeth of the large-diameter gear 61. However, by setting the tooth thickness on the tip end side of the tooth of the pinion gear 72 to be larger than the tooth thickness on the tip end side of the large-diameter gear 61 and setting the tooth width to be larger, lifetime of the pinion gear 72 can be extended.

Also, further on the side of the gear case 13 (X2 side) than the pinion gear 72 in the drive shaft 70 is provided a pivotally supporting portion 75. The pivotally supporting portion 75 is a part to which the bearing B5 is attached on an outer circumferential side thereof, and this bearing B5 is attached to a bearing attaching portion 13b provided in the gear case 13. Accordingly, an end portion on the X2 side of the drive shaft 70 is rotatably supported by the gear case 13 via the bearing B5. Further, on the side of the hand wheel 80 in the drive shaft 70 is provided a male screw portion 76. The male screw portion 76 is a part by which a female screw portion 81 of the hand wheel 80 and a female screw portion 91a of a brake receiver 91 are screwed. At an end portion on the X2 side of the male screw portion 76 is provided a step 77, and the below-mentioned brake receiver 91 is locked by this step 77. Also, further on the X1 side than the male screw portion 76 is provided a tip end small-diameter portion 78 having a male screw portion 78a and a pin hole 78b. After a below-mentioned washer 83 is arranged on the tip end small-diameter portion 78, and a groove nut 84 is screwed over the male screw portion 78a, a stopper pin 79 is inserted in the pin hole 78b, thus to prevent the groove nut 84 from being loosened.

As illustrated in FIGS. 1, 2, and 4, the gear case 13 is a member which covers the speed reducing mechanism 30 including the speed reducing gear member 60 and the load gear 31 and is fixed on the first frame 11 via the stay bolts SB and the nuts N. This gear case 13 functions as a falling prevention portion. The gear case 13 also includes an attaching plate portion 130 and a gear storage portion 131. The attaching plate portion 130 is a part surface-contacting the first frame 11. Meanwhile, the gear case 13 may be formed by deep-drawing a plate or the like.

In the present embodiment, the attaching plate portion 130 is formed in a similar shape to the aforementioned shape formed by connecting the linear parts of the three frame projection portions 111. However, when the chain block 10 is dragged, the first frame 11 rather than the gear case 13 is preferably dragged. For this reason, the attaching plate portion 130 is provided so that, around each of the frame projection portions 111, the frame projection portion 111 may project further outward than the attaching plate portion 130.

As illustrated in FIGS. 1, 2, and 4, the gear storage portion 131 is formed in a shape of being raised to the X2 side from the attaching plate portion 130. In the present embodiment, a projecting height of the gear storage portion 131 from the attaching plate portion 130 is set to be longer than a distance between the first frame 11 and the second frame 12. However, any height of the gear storage portion 131 may be set as long as it enables a favorable posture return in a case of falling of the chain block 10.

As illustrated in FIG. 1, a name plate 132 is attached to the gear storage portion 131 via rivets 133. To enable such attaching, the gear storage portion 131 is provided with not-illustrated hole portions in which the rivets 133 are to be inserted.

Also, as illustrated in FIG. 1, positional relation between an outer rim portion of the first frame 11 and an outer rim portion of the gear case 13 is as follows. That is, around each of the frame projection portions 111, the projecting amount of the outer rim portion of the first frame 11 with respect to the outer rim portion of the gear case 13 is set to be small. However, on a lower side of each of the recesses 113a and on an upper side of each of the recesses 113b, the projecting amount of the outer rim portion of the first frame 11 with respect to the outer rim portion of the gear case 13 is set to be large. Hereinbelow, a part of the first frame 11 whose projecting amount with respect to the outer rim portion of the gear case 13 is larger than that around the frame projection portion 111 is referred to as a stretching portion 114. The stretching portion 114 on the upper side of the recess 113b projects from the outer rim portion of the gear case 13 more significantly than the stretching portion 114 on the lower side of the recess 113a. Providing such stretching portions 114 enables a dragged part to be away from the gear storage portion 131 even in a case in which the chain block 10 is dragged.

Also, the gear storage portion 131 of the gear case 13 is continuous with a lower recess 132a and an upper recess 132b. Providing the lower recess 132a and the upper recess 132b enables strength of the gear case 13 to be enhanced.

As illustrated in FIGS. 4 and 5, over an end surface on a side not opposed to the first frame 11 in the second frame 12 are provided the hand wheel 80 and a brake mechanism 90. The hand wheel 80 has the female screw portion 81 on a center side thereof, and this female screw portion 81 is screwed by the male screw portion 76 of the drive shaft 70. Also, between opposed flange portions 80a as a pair on an outer circumferential side of the hand wheel 80 is provided a chain pocket 82 similar to that of the load sheave 23 described above. The chain pocket 82 is a part in which a metal ring C2a of a hand chain C2 is fitted and has a horizontal pocket (not illustrated) in which the metal ring C2a is fitted in a state in which a direction in which the metal ring C2a is flat is parallel to the axial direction and a vertical pocket (not illustrated) which is in a deeper groove shape than the horizontal pocket and in which the metal ring C2a is fitted in a state in which the direction in which the metal ring C2a is flat intersects with the axial direction.

Also, the brake mechanism 90 includes main components such as the brake receiver 91, brake plates 92, a ratchet wheel 94, pawl members 95, and a brake cover 96. As illustrated in FIGS. 4 and 5, on a side of the second frame 12 in the male screw portion 76 of the drive shaft 70 is arranged the brake receiver 91. The brake receiver 91 has the female screw portion 91a on a center side thereof and further has a flange portion 91b and a hollow boss portion 91c. The female screw portion 91a is a part to be screwed by the male screw portion 76 of the drive shaft 70, and this screwing causes the flange portion 91b of the brake receiver 91 to be locked by the step 77. The flange portion 91b is a part set to have a larger diameter than the hollow boss portion 91c and can receive the below-mentioned brake plate 92. The hollow boss portion 91c is situated further on the side of the hand wheel 80 (X1 side) than the flange portion 91b and supports the ratchet wheel 94 via a below-mentioned bush 93.

The brake plate 92 (92a) is situated between the flange portion 91b and the below-mentioned ratchet wheel 94 and applies a large friction force between the flange portion 91b and the below-mentioned ratchet wheel 94 in a case of being pressed from the side of the hand wheel 80, and this large friction force brings about a state in which the brake receiver 91 is rotated integrally with the ratchet wheel 94. Meanwhile, the brake plate 92 (92b) is arranged between the ratchet wheel 94 and the hand wheel 80 as well and applies a large friction force between the ratchet wheel 94 and the hand wheel 80 due to press from the side of the hand wheel 80, and this large friction force brings about a state in which the hand wheel 80 is rotated integrally with the ratchet wheel 94.

Figure 21:
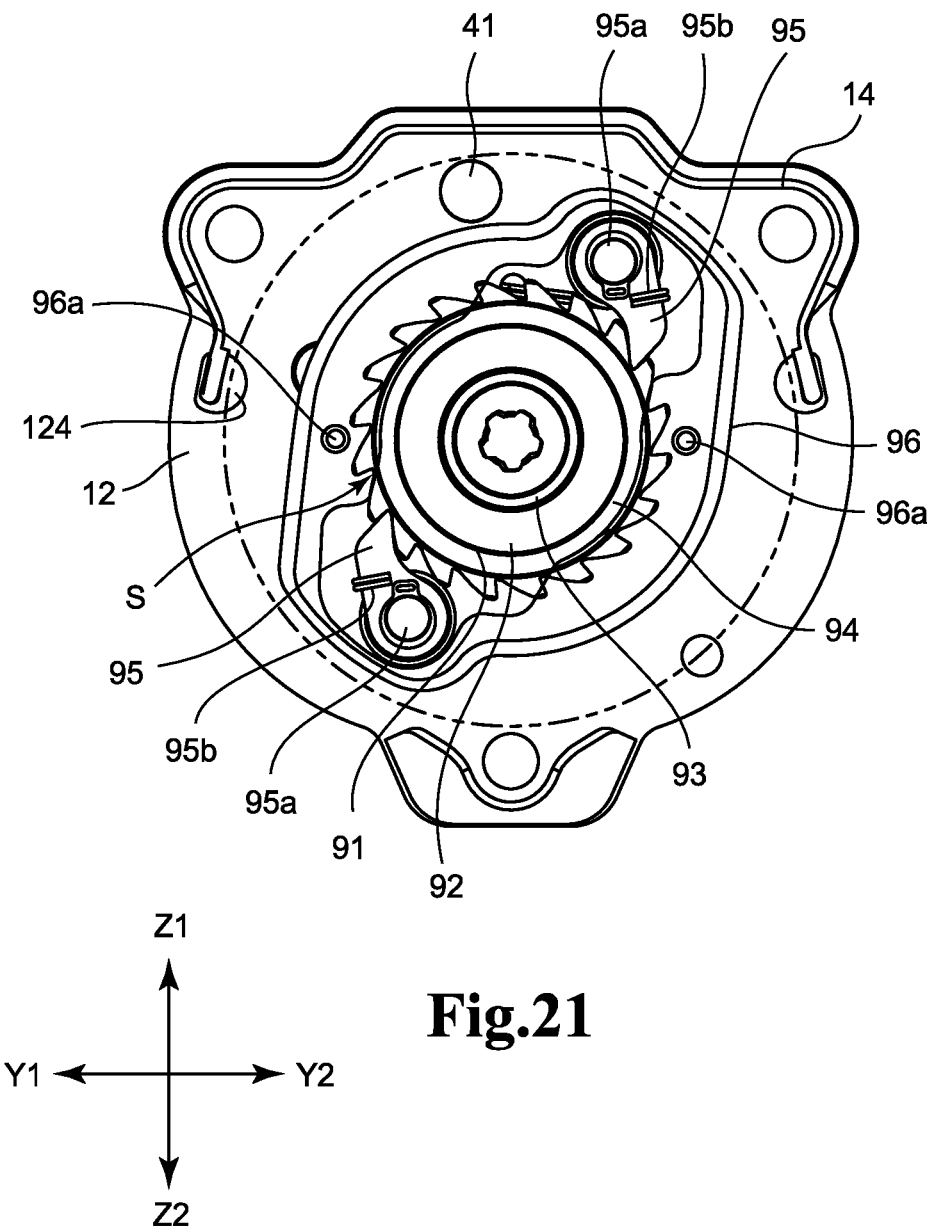
FIG. 21 illustrates arrangement of a ratchet wheel and pawl members in the chain block in FIG. 1.

As illustrated in FIGS. 4 and 5, to the hollow boss portion 91c of the brake receiver 91 is attached the bush 93, and on an outer circumferential side of this bush 93 is provided the ratchet wheel 94. Accordingly, the ratchet wheel 94 is provided rotatably with respect to the brake receiver 91. As illustrated in FIG. 21, a ratchet mechanism is constructed, in which a tip end of each pawl member 95 meshes with a tooth portion 94a of the ratchet wheel 94 to prevent reverse rotation (rotation in an upward winding direction) of the ratchet wheel 94 by means of this mesh. Meanwhile, each pawl member 95 is provided to be turnable, centering on a pawl shaft 95a, and is provided with an end of a biasing spring 95b which applies a biasing force thereto so that the tip end of the pawl member 95 may mesh with the tooth portion 94a of the ratchet wheel 94 at all times.

Also, the pawl members 95 are provided as a pair, and in the configuration illustrated in FIG. 21, one pawl member 95 is arranged at a position inclined at predetermined degrees such as 30 degrees to the vertical direction. Also, the other pawl member 95 is provided at a position adjacent to one pawl member 95, and an arrangement state thereof is one in which the pair of pawl members 95 fits in the same quadrant such as a first quadrant of a Cartesian coordinate system. Thus, a space S is formed at a position (position on the Z2 side and on a Y2 side in FIG. 21) corresponding to a third quadrant in the Cartesian coordinate system including the first quadrant, and the lower hook 45 can be situated in this space S in a case in which the load chain C1 is wound up. However, as for arrangement of the pair of pawl members 95, other arrangement may be adopted. For example, a configuration in which the pawl members 95 are arranged in a diagonal direction with a rotation center of the ratchet wheel 94 interposed therebetween may be adopted.

As illustrated in FIG. 21, the brake cover 96 attached to the second frame 12 is a member situated further on an outer circumferential side than the ratchet wheel 94 and the pawl members 95 and protecting them. This brake cover 96 has boss portions 96a. Each of the boss portions 96a is situated in a boss hole 125 of the second frame 12 to align the brake cover 96 in a rotating direction.

Such a configuration enables the amount of work for aligning the brake cover 96 to be reduced and enables manpower for attachment to be reduced. As described above, the second frame 12 is provided with the brake cover 96 adapted to cover the brake mechanism 90 that brakes rotation of the drive shaft 70, the brake cover 96 is provided with one or the plurality of boss portions 96a each to be inserted in the boss hole 125 of the second frame 12, and the brake cover 96 is aligned with the second frame 12 by the boss portions 96a.

Figure 22:
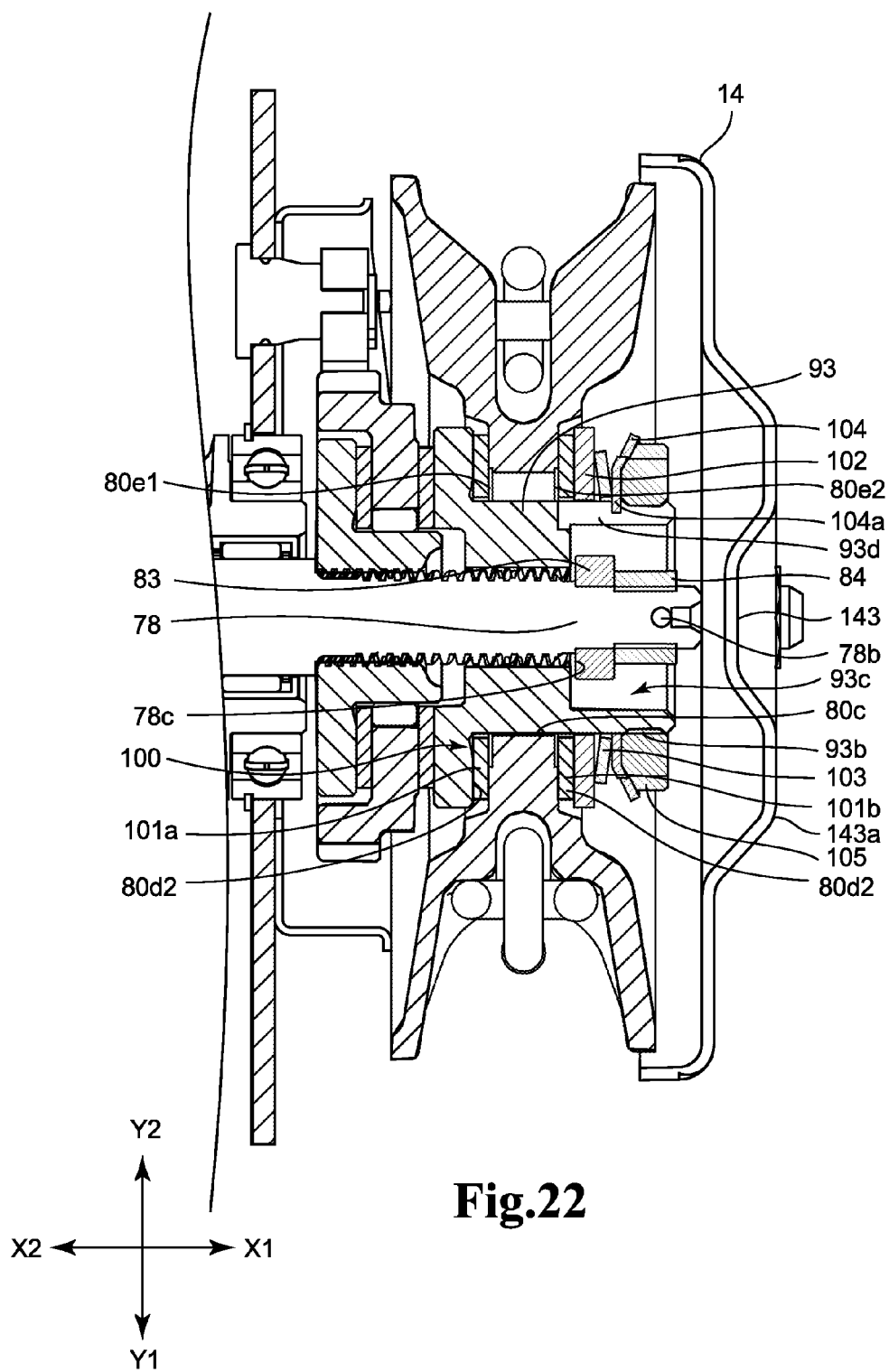
FIG. 22 is an enlarged side cross-sectional view illustrating a configuration of an excessive load prevention mechanism in the chain block in FIG. 1.

Also, as illustrated in FIGS. 4, 5, 22, and the like, an excessive load prevention mechanism 100 is provided on an inner circumferential side of the hand wheel 80. The excessive load prevention mechanism 100 is provided on an outer circumferential side of the bush 93 passing through a through hole 80c on the inner circumferential side of the hand wheel 80. Specifically, on the inner circumferential side of the hand wheel 80 are provided inner circumferential recesses 80d1 and 80d2 which form steps with the through hole 80c, have larger diameters than that of the through hole 80c, and is recessed in directions of being thinner than the through hole 80c. In these inner circumferential recesses 80d1 and 80d2, friction plates 101a and 101b are arranged, respectively. Meanwhile, a recess depth of the inner circumferential recesses 80d2 is set to be deeper than a recess depth of the inner circumferential recesses 80d1. This enables a part of a below-mentioned washer 102 to go into the inner circumferential recesses 80d2.

The friction plate 101a is located on the X2 side of the hand wheel 80 and is interposed between a bottom portion of the inner circumferential recesses 80d1 and a flange portion 93a of the bush 93. Also, the friction plate 101b is located on the X1 side of the hand wheel 80 and is interposed between a bottom portion of the inner circumferential recesses 80d2 and the washer 102. The X1 side of the washer 102 contacts a plate spring 103, the X1 side of the plate spring 103 is provided with a washer 104 having a key 104a, and the key 104a is inserted in a key groove 93d. Also, the X1 side of the washer 104 contacts a fastening member 105.

Meanwhile, the hand wheel 80 is provided with center recesses 80e1 and 80e2 as well as the inner circumferential recesses 80d1 and 80d2. The center recesses 80e1 and 80e2 are recessed in directions of being thinner than the inner circumferential recesses 80d1 and 80d2 on a center side in a radial direction of the hand wheel 80. Accordingly, in a case in which the friction plates 101a and 101b are arranged in the inner circumferential recesses 80d1 and 80d2, respectively, outer circumferential sides of the friction plates 101a and 101b contact the bottom portions of the inner circumferential recesses 80d1 and 80d2, but inner circumferential sides of the friction plates 101a and 101b do not contact the bottom portions due to the presence of the center recesses 80e1 and 80e2. However, even in the configuration in which the inner outer circumferential sides of the friction plates 101a and 101b do not contact the hand wheel 80, forces with which the friction plates 101a and 101b are pressed by the inner circumferential recesses 80d1 and 80d2 are increased to enable the hand wheel 80 and the bush 93 to be rotated integrally.

Also, on an outer circumference of the bush 93 on the X1 side, a screw portion 93b is provided, and a fastening member 105 is screwed on the screw portion 93b. Thus, as the fastening member 105 is screwed strongly, rotation of the drive shaft 70 is transmitted via the bush 93, the friction plates 101a and 101b, and the like to the hand wheel 80. However, in a case in which excessive load acts on the hand wheel 80, the friction plates 101a and 101b slide on at least either the hand wheel 80 or the bush 93 to prevent a side of the drive shaft 70 from being rotated.

Figure 19:
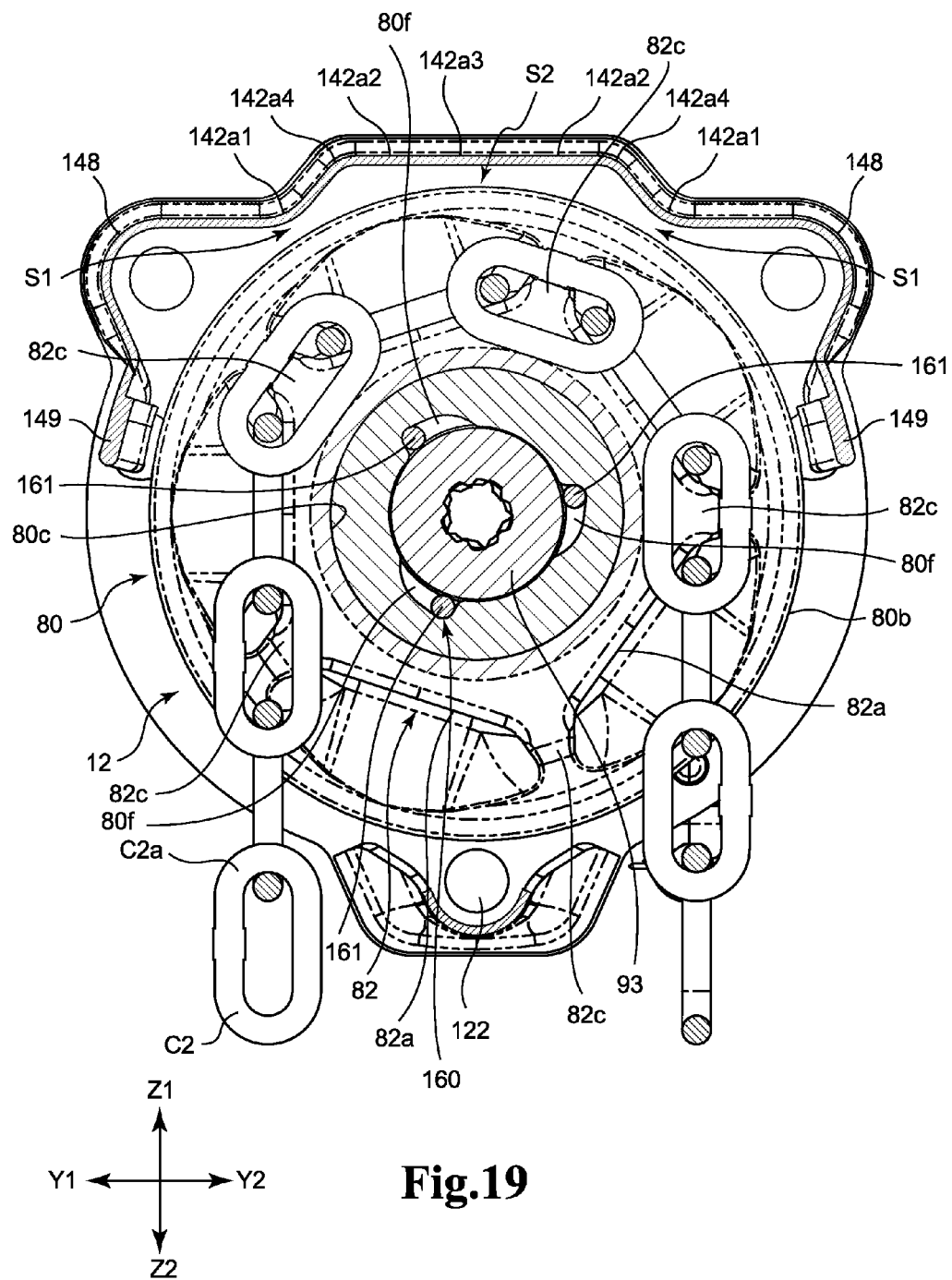
FIG. 19 illustrates a configuration around a chain pocket of a hand wheel in the chain block in FIG. 1.

Here, the hand wheel 80 is provided with a one-way clutch mechanism 160. The one-way clutch mechanism 160 is provided around the aforementioned through hole 80c. That is, as illustrated in FIG. 19, storage portions 80f are provided around the through hole 80c, and each of the storage portions 80f has a wall surface which proceeds to an outside diameter side from the hand wheel 80 along the circumferential direction.

Each of the storage portions 80f has stored therein a ball 161. The ball 161 is pressed by a strong force between the hand wheel 80 and the bush 93 at the time of upward winding, and a rotation force of the hand wheel 80 is thus transmitted via the ball 161 to the bush 93 and is screwed to the X2 side of the male screw portion 76. However, at the time of downward winding, the ball 161 is not pressed between the hand wheel 80 and the bush 93 and is in a state of moving freely, and the rotation force of the hand wheel 80 is not transmitted to the bush 93 via the ball 161.

Meanwhile, the ball 161 is as long as or slightly shorter than each of the center recesses 80e1 and 80e2. Thus, in a case in which the ball 161 is stored in the storage portion 80f, the ball 161 can be prevented from contacting each of the friction plates 101a and 101b by a strong force to cause the friction plates 101a and 101b to be scraped.

As illustrated in FIG. 22, a dent portion 93c is provided on the X1 side of the bush 93. The dent portion 93c is a part dented from an end surface of the bush 93 on the X1 side toward the X2 side. Due to the presence of this dent portion 93c, the bush 93 is formed in a cylindrical shape on the X1 side. Also, the bush 93 is provided with the key groove 93d from the X1 side to the X2 side, and the dent portion 93c passes through the key groove 93d.

As illustrated in FIG. 22, the washer 83 and the groove nut 84 are arranged in the dent portion 93c. The washer 83 is situated between the groove nut 84 and a step portion 78c of the tip end small-diameter portion 78. At the time of downward winding in the hand wheel 80, the washer 83 receives an impact applied from the hand wheel 80 to prevent the impact from being applied directly to the groove nut 84. That is, the washer 83 functions as a buffer that protects the groove nut 84.

Also, the groove nut 84 is a nut having groove portions 84a formed at symmetric positions in a circumferential direction and is screwed over the male screw portion 78a. Thus, after the groove nut 84 is screwed over the male screw portion 78a, a stopper pin 85 is inserted into the groove portions 84a and the pin hole 78b of the tip end small-diameter portion 78, thus to prevent the groove nut 84 from being loosened and moving to the X1 side. Accordingly, the hand wheel 80 is prevented from moving to the X1 side.

Meanwhile, when the groove nut 84 is provided deeply inside the dent portion 93c, it is difficult to insert the stopper pin 85 into the pin hole 78b and the groove portions 84a. On the other hand, in a case of a configuration in which the groove nut 84 projects from the dent portion 93c to the X1 side, the drive shaft 70 needs to be extended as much.

Therefore, as illustrated in FIG. 22, a thickness of the washer 83 is set so that the groove nut 84 may not reside in the dent portion 93c completely but partially project from the dent portion 93c. That is, the washer 83 also functions as a spacer that adjusts a position of the groove nut 84. For this reason, the washer 83 is configured to be thicker than a normal washer. In addition, the pin hole 78b is configured so that at least a part thereof may project from the dent portion 93c. Accordingly, while the drive shaft 70 reduces a length thereof, the stopper pin 85 is inserted into the pin hole 78b and the groove portions 84a easily.

Although the chain block 10 including the excessive load prevention mechanism 100 has been described in the present embodiment, a configuration of not including the excessive load prevention mechanism 100 may be employed. Even in the configuration of not including the excessive load prevention mechanism 100, a configuration in which the bush 93 includes the dent portion 93c, and in which the washer 83 and the groove nut 84 are arranged in the dent portion 93c, may be employed. In this case, the configuration can be employed in common regardless of whether or not the excessive load prevention mechanism 100 is provided. Also, even in the configuration of not including the excessive load prevention mechanism 100, the washer 83 can protect the groove nut 84 as the buffer. In addition, a configuration in which the washer 83 functions as the spacer, and in which the groove nut 84 does not reside in the dent portion 93c completely but partially project from the dent portion 93c, can be achieved. Thus, while the drive shaft 70 reduces a length thereof, the stopper pin 85 is inserted into the pin hole 78b and the groove portions 84a easily.

The wheel cover 14 is a member covering an upper side of the hand wheel 80 and an upper side of the brake mechanism 90 (refer to FIGS. 1 to 3 and the like) and is fixed on the second frame 12 via the stay bolts SB and the nuts N. This wheel cover 14 functions as a falling prevention portion. The wheel cover 14 is formed by means of plastic working such as press working and by means of plastic working, it includes a flange portion 141, a side surface portion 142, an end surface portion 143 as illustrated in FIG. 23. The flange portion 141 is a part contacting the second frame 12. This flange portion 141 surface-contacts the second frame 12 and is thus provided in a state of favorably resisting fastening forces between the stay bolts SB and the nuts N. To achieve such surface contact, the flange portion 141 is formed to spread outward with respect to the side surface portion 142 toward a tip end side (X2 side) separating from the end surface portion 143 so as to be parallel to the second frame 12.

Meanwhile, the flange portion 141 is bent at an angle to be approximately perpendicular to the side surface portion 142, but in a state in which the wheel cover 14 is attached, the side surface portion 142 is not necessarily perpendicular to the second frame 12. Hence, the flange portion 141 may be bent at an angle to be perpendicular to the side surface portion 142 but does not always have to be bent perpendicularly.

Also, the wheel cover 14 illustrated in FIG. 23 and the like may be formed by deep-drawing a steel plate or the like.

The side surface portion 142 is a part connecting the flange portion 141 with an outer rim portion of the end surface portion 143 and is formed to have a large dimension in a direction of approaching to and separating from the second frame 12 (X direction) as illustrated in FIG. 1 and the like. Also, the side surface portion 142 is not provided over an entire circumference of the outer rim portion of the end surface portion 143. That is, the side surface portion 142 includes a part located on an upper side (hereinbelow referred to as an upper side surface portion 142a as needed) and a part located on a lower side (hereinbelow referred to as a lower side surface portion 142b as needed). On the upper side (Z1 side) of the wheel cover 14, two pairs each consisting of the stay bolt SB and the nut N are provided along the Y direction. Conversely, on the lower side (Z2 side) of the wheel cover 14, only one pair consisting of the stay bolt SB and the nut N is provided. Hence, the upper side surface portion 142a has a larger dimension in the Y direction than the lower side surface portion 142b and is provided with a pair of surrounding portions 148 (described below).

From a cut-out portion 144 between the upper side surface portion 142a and the lower side surface portion 142b, the hand chain C2 can be extended. Also, a right-left side surface portion 145 is provided at a part further on a side of the end surface portion 143 than the cut-out portion 144. The right-left side surface portion 145 is a part extending from the end surface portion 143 toward the second frame 12 in a similar manner to the upper side surface portion 142a and the lower side surface portion 142b and has a length toward the second frame 12 set to be significantly shorter than those of the upper side surface portion 142a and the lower side surface portion 142b due to the presence of the cut-out portion 144.

Also, the lower side surface portion 142b is formed in the following shape. That is, to reduce the size of the chain block 10, the size of the hand wheel 80 needs to be reduced, and the insertion hole 122 on the lower side (Z2 side) through which the stay bolt SB passes needs to get close to the side of the hand wheel 80 (refer to FIGS. 3, 4, 23, and the like). However, when the size of the hand wheel 80 is reduced, the hand chain C2 is easy to interfere with the lower side surface portion 142b as much. In particular, the hand chain C2 is pulled obliquely in many cases. Thus, in consideration of the case in which the hand chain C2 is pulled obliquely, a width (dimension in the Y direction) of the lower side surface portion 142b needs to be shortened as well.

However, when the width of the lower side surface portion 142b is just shortened, strength of the wheel cover 14 becomes insufficient. Therefore, as illustrated in FIG. 23, the lower side surface portion 142b is formed in a curved and surrounding shape. When tangent lines of an outer circumferential surface of the lower side surface portion 142b are assumed, the tangent lines extending from end portions of the upper side (Z1 side) to the lower side (Z2 side) intersect to form an acute angle. This improves strength of the lower side surface portion 142b.

Further, as illustrated in FIG. 23 and the like, a part of the lower side surface portion 142b on the side of the second frame 12 is provided to be wider than a part located further on the X1 side. Accordingly, the wheel cover 14 can receive a large force applied to the wheel cover 14, which can improve the strength of the lower side surface portion 142b.

Also, the end surface portion 143 is a part of the wheel cover 14 opposed to the hand wheel 80. This end surface portion 143 is provided to be continuous with the upper side surface portion 142a, the lower side surface portion 142b, and the right-left side surface portion 145 at the outer rim portion thereof. The end surface portion 143 also has large dimensions in the Y direction and a Z direction (corresponding to a dropping direction) in FIG. 23. This end surface portion 143 may be formed in a flat shape but may employ a configuration having protrusions and recesses to improve design or improve strength of the wheel cover 14 as illustrated in FIG. 23.

In a configuration illustrated in FIGS. 2, 3, and 23, the end surface portion 143 is provided with a protrusion 143a protruding toward the X1 side, and the protrusion 143a is formed approximately in a triangular shape in a planar view. Also, inside the protrusion 143a, a recess 143b recessed toward the X2 side is provided and is formed approximately in a triangular shape in a planar view.

Figure 24:
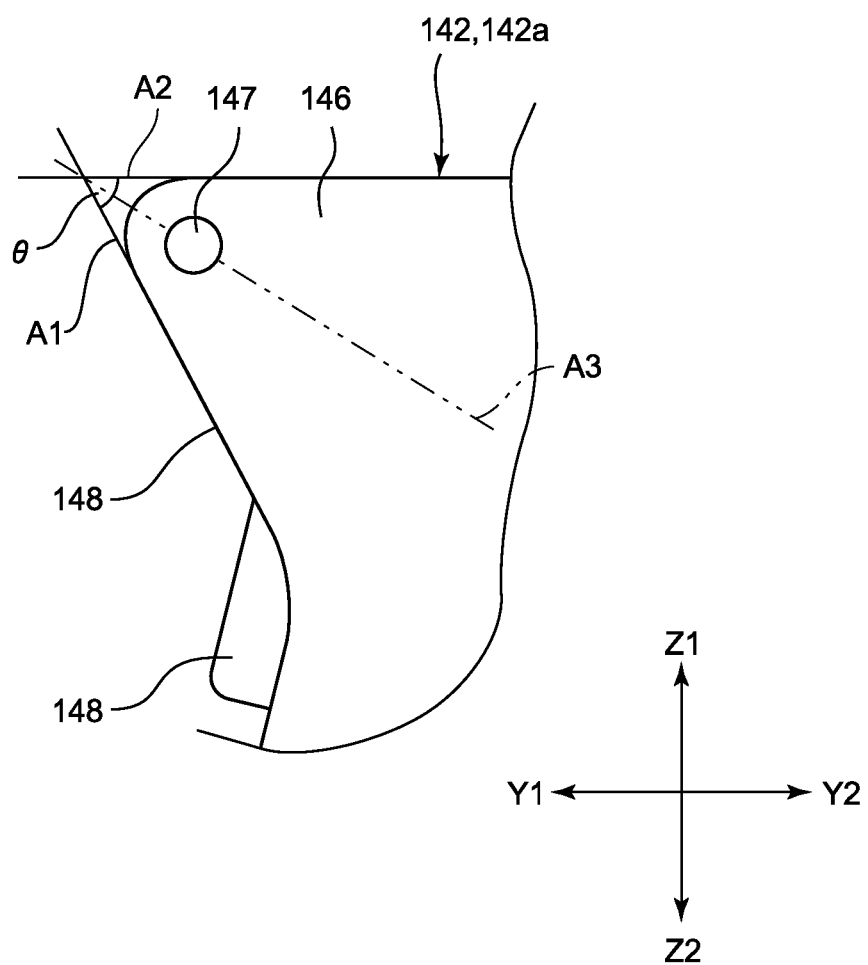
FIG. 24 is an enlarged partial plan view illustrating a shape around a projection part of an end surface portion in the wheel cover in FIG. 23.

In a case in which the protrusion 143a and the recess 143b formed approximately in triangular shapes are provided, the strength of the wheel cover 14 on the side of the end surface portion 143 can be improved. In addition, a position of the end surface portion 143 further on the outer circumferential side than the protrusion 143a is located further on the X2 side than the protrusion 143a. Hence, around a bolt hole 147 in which the stay bolt SB or the nut N is located, a projection height of the stay bolt SB or the nut N with respect to the protrusion 143a can be shortened, which enables a dimension of the chain block 10 in the X direction to be reduced. Also, as illustrated in FIGS. 3, 23, and 24, a corner part of the approximately triangular shape of the protrusion 143a is located close to the bolt hole 147. This brings about a configuration in which a rib shape exists around a fastening part of the nut N, to which a large force is applied, which enables the strength of the wheel cover 14 to be improved.

Also, as illustrated in FIGS. 4, 5, and 22, the recess 143b is provided to be opposed to the drive shaft 70 (tip end small-diameter portion 78) and the groove nut 84 with a narrow space. The width of this space is set to prevent the groove nut 84 from dropping from the male screw portion 78a of the tip end small-diameter portion 78 even in a case in which the stopper pin 85 is broken, and in which the groove nut 84 is loosened to the X1 side. Thus, the bush 93 is prevented from coming off of the female screw portion 81, and upward and downward winding operations in the hand wheel 80 can be maintained.

Also, as illustrated in FIGS. 3 and 23, in the present embodiment, the end surface portion 143 is provided so that a circular portion T1 formed in a circular shape having a radius from a center to an edge of R1 (in FIGS. 3 and 23, the circular part is in a partially circular shape whose upper part is cut out, but in the following description, such a partially circular shape shall be included in a circular shape) and a triangular portion T2 formed in a triangular shape having a distance from the same center to an edge of R2 may overlap with each other. Here, the radius R1 and the distance R2 have relation of R2>R1. Thus, corner sides of the triangular portion T2 are provided to project from the circular portion T1. Hereinbelow, each of these parts projecting from the circular portion T1 is referred to as a projection part 146.

In the present embodiment, the triangular portion T2 is provided to form an isosceles triangle in which a base is located on an upper side while a vertex is located on a lower side but may be provided to form an equilateral triangle or an approximately equilateral triangle. Also, the triangular portion may be provided to form a triangle other than the isosceles triangle.

Here, as is apparent from FIGS. 23 and 3, an outer rim portion of each surrounding portion 148 of the wheel cover 14 is provided at a similar position to an outer rim portion of the second frame 12. However, when the chain block 10 is dragged, the second frame 12 rather than the wheel cover 14 is preferably dragged. For this reason, around each of the frame projection portions 121, the outer rim portion of the frame projection portion 121 is provided to project further outward than the outer rim portion of the surrounding portion 148.

As illustrated in FIGS. 3 and 23, the projection part 146 is provided with a bolt hole 147 (corresponding to a fixing hole). Since each projection part 146 is provided with each bolt hole 147, in the present embodiment, the three bolt holes 147 are provided on an outer rim side of the wheel cover 14, and two of them are provided on the upper side (Z1 side) along the Y direction.

As illustrated in FIGS. 3, 23, and 24, the upper side surface portion 142a is provided with the surrounding portions 148. An upper edge side (edge on the Z1 side) of each of the surrounding portions 148 is provided to be continuous with each of the projection parts 146. Also, each of the surrounding portions 148 is provided so that an angle □ between a tangent line A1 (may be a planar tangent plane A1) and a tangent line A2 (may be a planar tangent plane A2) in FIG. 24 may be an acute angle.

In a configuration illustrated in FIG. 24, the angle between the tangent line A1 (tangent plane A1) and the tangent line A2 (tangent plane A2) is set to approximately 60 degrees. Also, a line connecting an intersection point of the tangent line A1 (tangent plane A1) with the tangent line A2 (tangent plane A2) with a center is a bisector A3 of the angle between the tangent line A1 (tangent plane A1) and the tangent line A2 (tangent plane A2) or a line approximate to the bisector A3.

Figure 33:
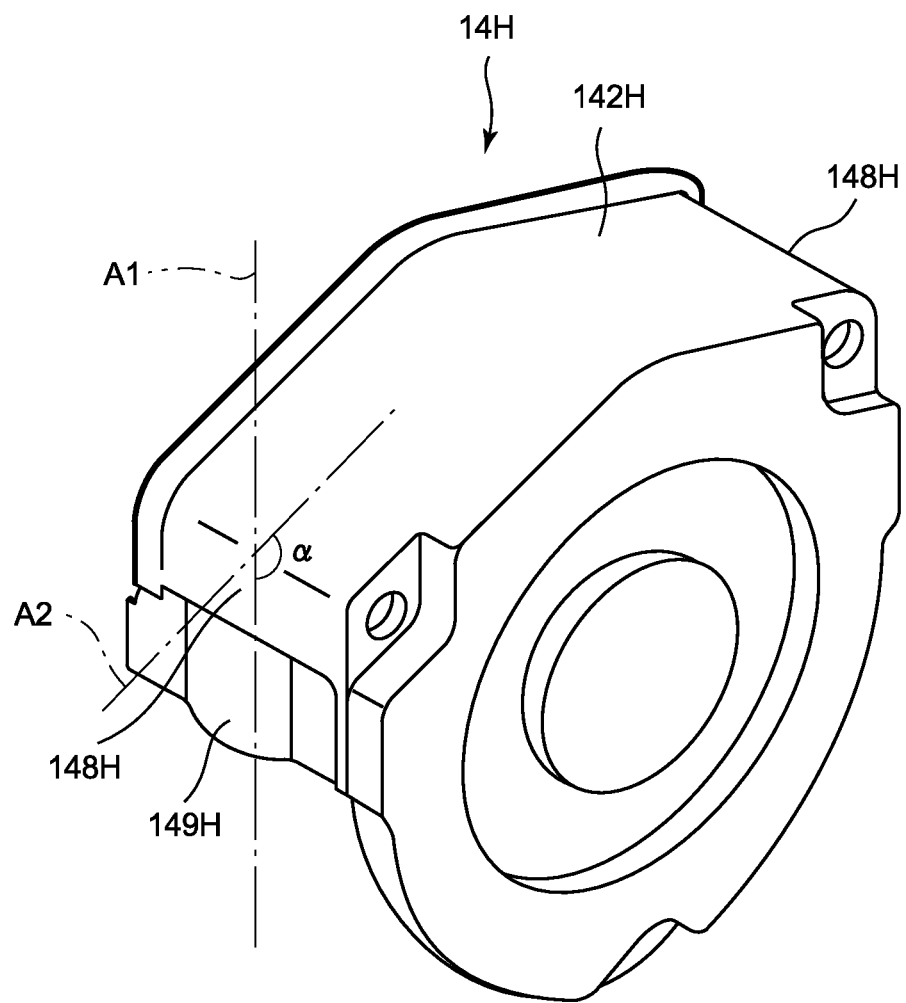
FIG. 33 is a perspective view illustrating a shape of the conventional wheel cover.

Here, in a conventional wheel cover 14H illustrated in FIGS. 25 and 33, an upper side surface portion 142H is provided so that an angle □ between a tangent line A1 (tangent plane A1) and a tangent line A2 (tangent plane A2) may be an obtuse angle. Thus, when the surrounding portion 148 of the wheel cover 14 according to the present embodiment and a part around an attaching position of the stay bolt SB in the conventional wheel cover 14H (a part corresponding to the surrounding portion 148; hereinbelow referred to as a corner portion 148H) are compared, the wheel cover 14 according to the present embodiment has a characteristic of higher strength.

To be specific in this respect, in a conventional configuration illustrated in FIG. 33, the corner portion 148H is provided to be further away from the stay bolt SB and the bolt hole 147 than the surrounding portion 148 according to the present embodiment as illustrated in FIGS. 23 and 24. Hence, the end surface portion 143 around the bolt hole 147 is easier to deform than in the case in which the surrounding portion 148 according to the present embodiment presents when a load acts. Conversely, in the present embodiment, the surrounding portion 148 is located further on an inner side of the end surface portion 143 than in the conventional configuration illustrated in FIG. 33 and is provided to be close to the stay bolt SB and the bolt hole 147. Thus, even when a load acts on the end surface portion 143 around the bolt hole 147, the end surface portion 143 and the surrounding portion 148 are difficult to deform.

Figure 25A:
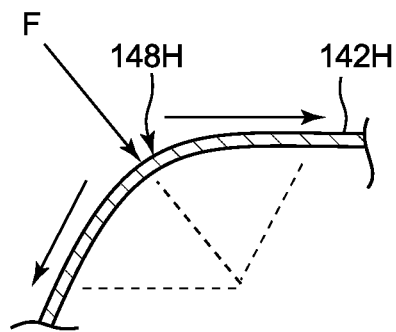
FIGS. 25(A) and 25(B) illustrate states in which a force acts on a side surface portion of the wheel cover.
Figure 25B:
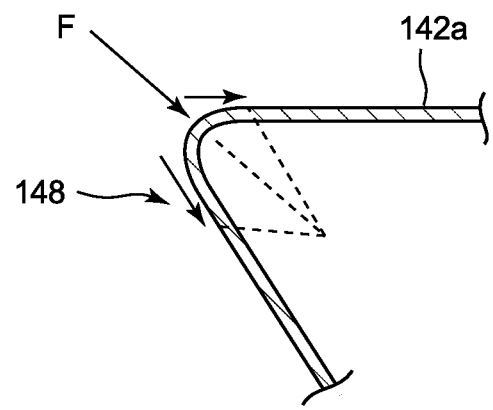

Here, states in which an external force acts on the surrounding portion 148 and the end surface portion 143 are illustrated in FIGS. 25(A) and 25(B). Consider a case in which force F heading for the rotation center acts on the part in the conventional configuration corresponding to the surrounding portion 148 as illustrated in FIG. 25(A) and a case in which the force F heading for the rotation center similarly acts on the surrounding portion 148 according to the present embodiment as illustrated in FIG. 25(B). As is apparent from FIGS. 25(A) and 25(B), a component force along the upper side surface portion 142a is larger in the conventional configuration. Accordingly, in the case in which the surrounding portion 148 according to the present embodiment presents, the strength is higher than in the conventional configuration as illustrated in FIGS. 25(A) and 33.

Also, as illustrated in FIGS. 2 and 23, the surrounding portion 148 is provided to be continuous with a chain guide portion 149. The chain guide portion 149 is a part provided to be close to the hand chain C2 and a part adapted to hold the hand chain C2 to prevent the hand chain C2 from coming off of the chain pocket 82 even when the hand chain C2 moves significantly (so to speak, even when the hand chain C2 is deflected). This chain guide portion 149 is provided to be located further on the lower side (Z2 side) than the surrounding portion 148 and includes a guide curved portion 149a, a leg portion 149b, and a tip end projection portion 149c. The guide curved portion 149a is a part opposed to the chain pocket 82 of the hand wheel 80. End portions of this guide curved portion 149a along the X direction are provided to be opposed to the flange portions 80a, respectively.

Meanwhile, a space between the end portion of the guide curved portion 149a and the flange portion 80a is preferably smaller than a diameter of a ring of the metal ring C2a of the hand chain C2. In the case of such a configuration, the hand chain C2 is prevented from coming off of the chain pocket 82 even when the hand chain C2 moves significantly (even when the hand chain C2 is deflected).

Also, the leg portion 149b has an end portion thereof on the X2 side provided at a similar position of the flange portion 141 to enable a surface of the end portion thereof to contact the second frame 12. Also, the surface of the end portion of the leg portion 149b is provided with the tip end projection portion 149c. The tip end projection portion 149c is a part to be inserted in an insertion hole 124 (refer to FIG. 21) provided in the second frame 12. The tip end projection portion 149c is inserted in the insertion hole 124 to enable strength of the chain guide portion 149 to be improved.

Figure 26:
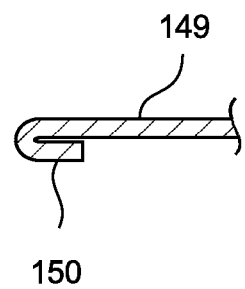
FIG. 26 is a partial cross-sectional view illustrating a configuration around a folded portion of a chain guide portion in the wheel cover in FIG. 23.

Here, as illustrated in FIG. 26, an outer edge portion on the lower side of the chain guide portion 149 is provided with a folded portion 150 by means of hemming. The folded portion 150 is provided over the entirety of the guide curved portion 149a and the leg portion 149b. Providing the folded portion 150 enables strength of the chain guide portion 149 to be improved. Providing the folded portion 150 also enables safety to be enhanced when a body part such as a hand contacts the folded part 150. However, the folded portion 150 does not need to be provided over the entirety of the guide curved portion 149a and the leg portion 149b and may employ a configuration in which the folded portion 150 does not exist at least in a part of it.

As illustrated in FIGS. 19, 23, and the like, the upper side surface portion 142a is provided with an upper guide portion 142a1. The upper guide portion 142a1 is a part which guides the hand chain C2 winding around the hand wheel 80 from the upper side (Z1 side). This upper guide portion 142a1 is formed by denting the upper side surface portion 142a so as to be closer to the side of the hand wheel 80 than the surrounding portion 148.

As illustrated in FIG. 19, between an inner wall surface of the dent-shaped upper guide portion 142a1 and the flange portions 80a and 80b, a space portion S1 which is narrower than a diameter of a ring of the metal ring C2a exists. In this case, the hand chain C2 can be prevented from coming off of the hand wheel 80 even when the hand chain C2 is deflected to cause the hand chain C2 to come off of the chain pocket 82. However, the space portion S1 may be provided to be wider than the diameter of the metal ring C2a.

The upper side surface portion 142a is also provided with an upper projection portion 142a2. The upper projection portion 142a2 is provided further to a center side in the up-down direction (Z direction) than the upper guide portion 142a1. The upper projection portion 142a2 is also provided to project further to the upper side (Z1 side) than the upper guide portion 142a1.

A projection dimension of the upper projection portion 142a2 to the upper side (Z1 side) is set in the following manner. That is, between an inner wall surface of the upper projection portion 142a2 and the flange portions 80a and 80b, a space portion S2 which is narrower than the diameter of the ring of the metal ring C2a exists. By setting the projection dimension of the upper projection portion 142a2 to the upper side (Z1 side) so that such a narrow part may exist, the hand chain C2 can be prevented from coming off of the hand wheel 80. However, the space portion S2 may be provided to be wider than the diameter of the metal ring C2a.

Meanwhile, a part of the upper projection portion 142a2 forming the space portion S2 is referred to as an upper guide portion 142a3. Also, the space portions S1 and S2 and the chain guide portions 149 are preferably provided approximately at regular intervals.

As is apparent from FIG. 19 and the like, the upper side surface portion 142a is further provided with a widely formed portion 142a4 having a wide space to the flange portions 80a and 80b in a state of being continuous with the upper guide portions 142a1 and 142a3.

In a case in which this widely formed portion 142a4 exists, a frequency at which the hand chain C2 is deflected to almost come off of the hand wheel 80 and hits the upper side surface portion 142a is reduced in comparison with a case in which the widely formed portion 142a4 does not exist. Thus, resistance at the time of pulling the hand chain C2 can be reduced. Also, there is a case in which, while the hand chain C2 is being pulled, the hand chain C2 gets in a jammed (locked) state between the hand wheel 80 and the upper side surface portion 142a and stops moving.

In particular, in a case in which a long arc-like upper guide portion is provided without forming the widely formed portion 142a4, when the hand chain C2 is jammed (locked), it is difficult to trigger a recovery to a state in which the hand chain C2 is not jammed since narrow spaces, which are parts with similar dimension conditions, are provided in a row. However, in the case in which the widely formed portion 142a4 exists, a space dimension between the flange portions 80a and 80b and the upper side surface portion 142a changes in comparison with the case in which the widely formed portion 142a4 does not exist. Thus, it is possible to trigger the recovery from the state in which the hand chain C2 is jammed to the state in which the hand chain C2 is not jammed.

Also, it is not preferable that the metal ring C2a of the hand chain C2 comes off of the hand wheel 80 due to the presence of the widely formed portion 142a4. Thus, a length of the widely formed portion 142a4 in the circumferential direction is preferably shorter than a length of the metal ring C2a (dimension in a longer direction). Also, the space between the widely formed portion 142a4 and the flange portions 80a and 80b is preferably shorter than a width of the metal ring C2a (dimension in a shorter direction). It is noted that a part further to a side of the surrounding portion 148 than the upper guide portion 142a1 may be a widely formed portion, but in this case, the widely formed portion is in a state of being split by the stay bolt SB.

It is to be noted that a configuration in which a long arc-like upper guide portion is provided without forming the widely formed portion 142a4 may be employed. In this case, for example, a configuration in which an arc-like upper guide portion is provided over a part between the surrounding portions 148 as a pair may be employed.

As described above, the upper side surface portion 142a is provided with the upper guide portion 142a1 that shortens the space between itself and the flange portions 80a and 80b of the hand wheel 80, and due to the upper guide portion 142a1, the hand chain C2 is guided in a state in which the hand chain C2 is prevented from coming off of the hand wheel 80. Also, the upper side surface portion 142a is provided with the upper projection portion 142a2 projecting further to the upper side than the surrounding portion 148 as well as the upper guide portion 142a1 continuing with the surrounding portion 148, and the upper projection portion 142a2 is further provided with the upper guide portion 142a3. Also, each of the upper guide portions 142a1 is provided with the widely formed portion 142a4 adjacently.

(About Configuration for Preventing Falling when Chain Block 10 is Dragged)

Next, in the chain block 10 configured as above, a configuration for preventing falling when the chain block 10 is dragged will be described.

First, in the configuration for preventing falling, the aforementioned frame projection portions 111 and 121 are provided. Providing these frame projection portions 111 and 121 prevents the first frame 11 and the second frame 12 from rolling along the circumferential directions and enables velocity generated by rolling of the chain block 10 to be decreased.

Also, as illustrated in FIGS. 27(A) and 27(B), the chain block 10 is configured so that a dimension a of the chain block 10 in the Y direction and a dimension b thereof in the X direction may have the following relation.

$$b \geq a \qquad \text{(Equation 1)}$$

In the chain block 10, the dimension a is a length between end portions of the outer rim portions in the Y direction of the first frame 11 and the second frame 12. Also, the dimension b is a length between end portions in the X direction of the chain block 10. In this case, the dimension b is a dimension from an edge portion on the X1 side of the protrusion 143a to an edge portion on the X1 side of the gear case 13. However, the dimension b may be a dimension from a flat part of the end surface portion 143, not the edge portion on the X1 side of the protrusion 143a, to an edge portion on the X1 side of the gear case 13 or may be a dimension with reference to other parts (such as an internal wall surface on the X1 side of the wheel cover 14 and an internal wall surface on the X2 side of the gear case 13).

Also, the chain block 10 is configured so that a weight W1 of the side of the gear case 13 and a weight W2 of the side of the wheel cover 14 may have the following relation.

$$W2 \geq W1 \qquad \text{(Equation 2)}$$

Meanwhile, in relation to (Equation 2), the side of the gear case 13 and the side of the wheel cover 14 may have relation in which moment acting on the side of the wheel cover 14 is larger than moment acting on the side of the gear case 13. Also, any part that is attached to the first frame 11 and whose weight is added to the weight W1 of the side of the gear case 13 corresponds to a gear case side structure while any part that is attached to the second frame 12 and whose weight is added to the weight W2 of the side of the wheel cover 14 corresponds to a wheel cover side structure.

Also, a height of the gear storage portion 131 is configured in the following manner That is, when the chain block 10 is inclined with the side of the gear storage portion 131 facing down and is dragged as it is, the chain block 10 may fall and contact the ground in a state in which the name plate 132 is opposed to the ground.

Figure 28A:
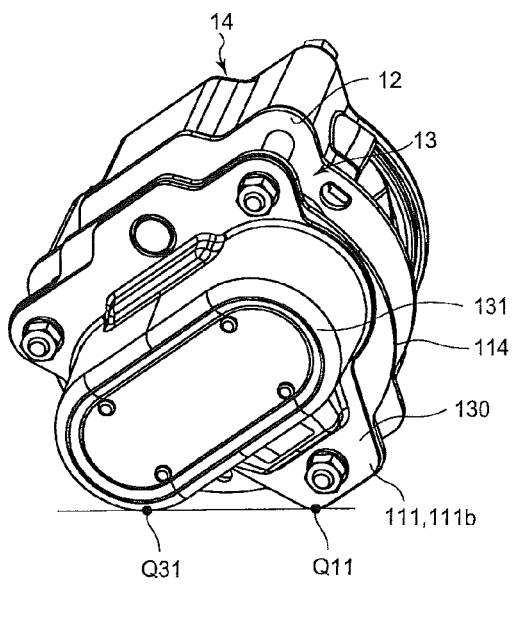
FIGS. 28(A) and 28(B) are perspective views illustrating a state in which the chain block in FIG. 1 is inclined to the side of the gear case.
Figure 28B:
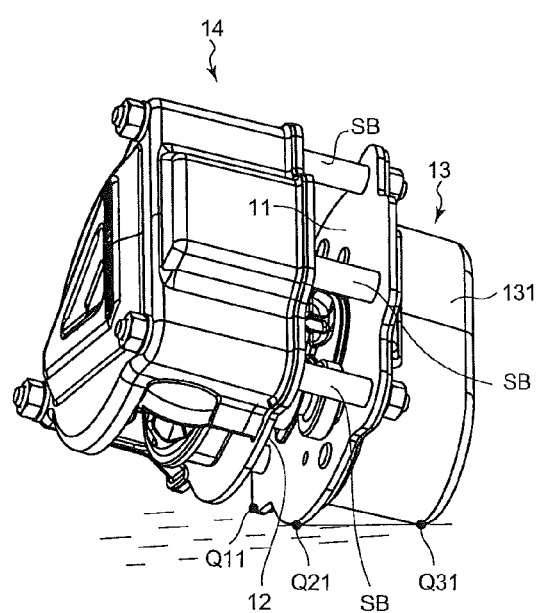

Here, the chain block 10 is most likely to fall in a case illustrated in FIGS. 28(A) and 28(B). The reason for this will be described based on FIGS. 27(A) and 27(B). A part on the side of the frame projection portion 111b that will contact the ground is referred to as a contact part Q11, a part of the outer rim portion of the first frame 11 that will contact the ground with the recess 113b interposed between the contact part Q11 and this part is referred to as a contact part Q21, and a straight line connecting the contact part Q11 with the contact part Q21 is referred to as a straight line P1. In this case, a contact part Q31 on the side of the gear storage portion 131 that will contact the ground at the same time as the contact parts Q11 and Q21 resides on a straight line perpendicular to the straight line P1.

Similarly, a part on the side of the frame projection portion 111a that will contact the ground is referred to as a contact part Q12, a part of the outer rim portion of the first frame 11 that will contact the ground with the recess 113a interposed between the contact part Q12 and this part is referred to as a contact part Q22, and a straight line connecting the contact part Q12 with the contact part Q22 is referred to as a straight line P2. In this case, a contact part Q32 on the side of the gear storage portion 131 that will contact the ground at the same time as the contact parts Q12 and Q22 resides on a straight line perpendicular to the straight line P2. Here, as is apparent from FIG. 27(A), a distance K1 between the straight line P1 and the contact part Q31 is longer than a distance K2 between the straight line P2 and the contact part Q32. Hence, in the case of the inclination illustrated in FIGS. 28(A) and 28(B) (that is, the case in which three points of the contact parts Q11, Q21, and Q31 contact the ground), an inclination angle □ of the chain block 10 is the largest, and the chain block 10 is most likely to fall.

Hereinbelow, the inclination of the chain block 10 in the case in which the contact parts Q11, Q21, and Q31 contact the ground is considered. In this case, to prevent the chain block 10 from being further inclined, a height S of the gear storage portion 131 has only to be sufficiently long. That is, the longer the height S of the gear storage portion 131 is, the smaller the inclination angle □ of the chain block 10 becomes. Accordingly, the height S of the gear storage portion 131 may be set in a direction in which a ceiling surface (surface to which the name plate 132 is attached) of the gear storage portion 31 will contact the ground as long as to prevent the chain block 10 from further rolling. Meanwhile, the height S may be a height at the contact part Q31 that will contact the ground from the first frame 11 to the gear storage portion 131.

Figure 29:
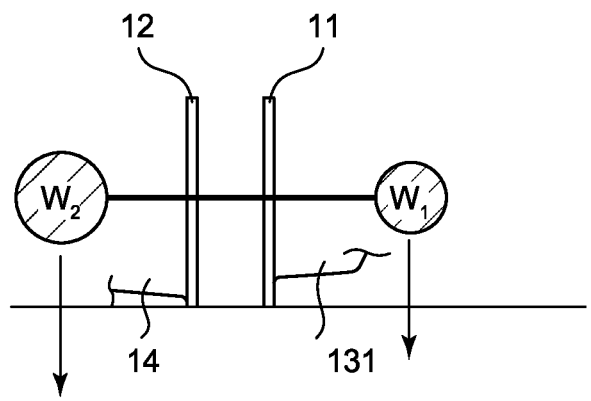
FIG. 29 illustrates a weight balance in the chain block in FIG. 1.

Here, as illustrated in FIG. 29, in the chain block 10, the side of the gear case 13 and the side of the wheel cover 14 are arranged so that the weight W1 of the side of the gear case 13 and the weight W2 of the side of the wheel cover 14 may be balanced with the first frame 11 and the second frame 12 interposed therebetween. Hence, even when the chain block 10 is inclined with the gear storage portion 131 facing down, the chain block 10 easily returns from the inclined posture to the standing posture due to the action of the weight W2 of the side of the wheel cover 14. Also, even when the chain block 10 is inclined with the gear storage portion 131 facing down, the gear storage portion 131 functions as a falling prevention portion, the contact part Q31 contacts the ground, and further falling is prevented.

A case in which the chain block 10 is inclined with the gear storage portion 131 facing down in a state in which the frame projection portion 111a abuts on the ground to prevent rolling is considered. As described above, the distance K1 between the straight line P1 and the contact part Q31 is longer than the distance K2 between the straight line P2 and the contact part Q32 (refer to FIG. 27(A)). Thus, the chain block 10 is more difficult to fall in the state in which the frame projection portion 111a abuts on the ground to prevent rolling than in a state in which the frame projection portion 111b abuts on the ground to prevent rolling.

Similarly, the chain block 10 is more difficult to fall when the chain block 10 is inclined with the wheel cover 14 facing down in a state in which the frame projection portion 121a or the frame projection portion 121b abuts on the ground to prevent rolling than in the state in which the frame projection portion 111b abuts on the ground to prevent rolling.

Figure 30:
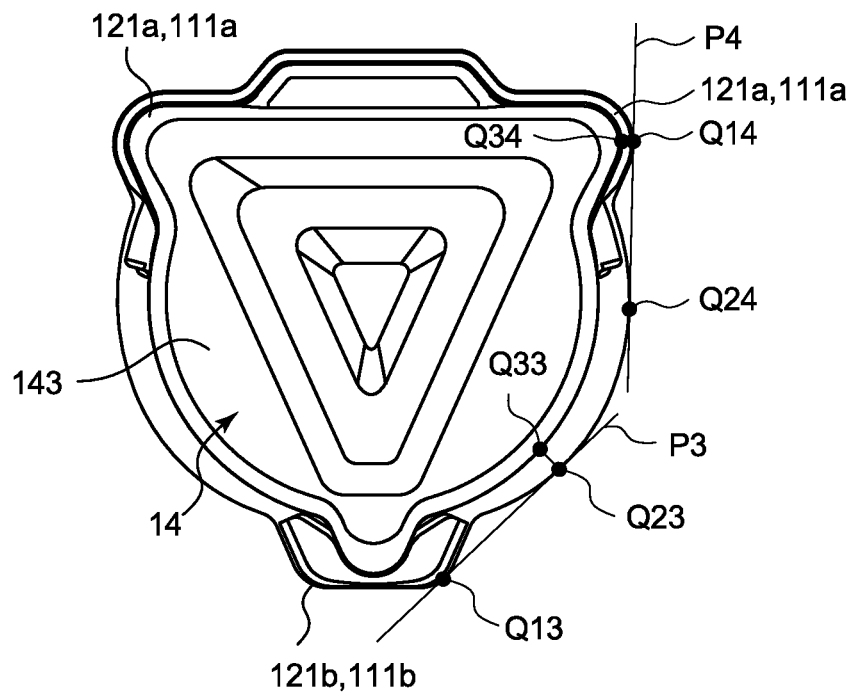
FIG. 30 is a front view illustrating contact parts on a side of the wheel cover in the chain block in FIG. 1.

This respect will be described. As illustrated in FIG. 30, a part on the side of the frame projection portion 121b that will contact the ground is referred to as a contact part Q13, a part of the outer rim portion of the second frame 12 that will contact the ground with the recess 123b interposed between the contact part Q13 and this part is referred to as a contact part Q23, and a straight line connecting the contact part Q13 with the contact part Q23 is referred to as a straight line P3. In this case, a contact part Q33 on the side of the wheel cover 14 that will contact the ground at the same time as the contact parts Q13 and Q23 resides on a straight line perpendicular to the straight line P3. However, a distance K3 between the straight line P3 and the contact part Q33 is shorter than the aforementioned distance K1.

Moreover, as is apparent from FIG. 2 and the like, a distance K5 (height) from the second frame 12 to the end surface portion 143 of the wheel cover 14 is equal to or longer than a distance K6 (height) from the first frame 11 to the ceiling surface of the gear storage portion 131. Accordingly, the chain block 10 is more difficult to fall when the chain block 10 is inclined with the side of the wheel cover 14 facing down in the state in which the frame projection portion 121b abuts on the ground to prevent rolling than in the state in which the frame projection portion 111b abuts on the ground to prevent rolling.

Similarly, a part on the side of the frame projection portion 121a that will contact the ground is referred to as a contact part Q14, a part of the outer rim portion of the second frame 12 that will contact the ground with the recess 123a interposed between the contact part Q14 and this part is referred to as a contact part Q24, and a straight line connecting the contact part Q14 with the contact part Q24 is referred to as a straight line P4. In this case, a contact part Q34 on the side of the wheel cover 14 that will contact the ground at the same time as the contact parts Q14 and Q24 resides on a straight line perpendicular to the straight line P4. However, a distance K4 between the straight line P4 and the contact part Q34 is shorter than the aforementioned distance K1. Moreover, as described above, the distance K5 is equal to or longer than the distance K6. Accordingly, the chain block 10 is more difficult to fall when the chain block 10 is inclined with the side of the wheel cover 14 facing down in the state in which the frame projection portion 121a abuts on the ground to prevent rolling than in the state in which the frame projection portion 111b abuts on the ground to prevent rolling.

Meanwhile, the contact parts Q11 to Q14 are configured to contact the ground at the same time as the contact parts Q21 to Q24 at positions spaced as much as predetermined rolling prevention distances from the contact parts Q21 to Q24. Accordingly, the contact parts Q11 to Q14 function as rolling restriction portions.

<About Action of Chain Block>

(1) About Action when Load is Raised or Lowered with Use of Chain Block 10

Action when a load is raised or lowered with use of the chain block 10 configured as above will be described below. In a case of raising a load with use of the aforementioned chain block 10, when the hand chain C2 is operated in the upward winding direction in a state in which the load is hung on the lower hook 45, the hand wheel 80 is rotated. At this time, due to mesh of the female screw portion 81 with the male screw portion 76 of the drive shaft 70, the hand wheel 80 travels in a direction (direction toward the X2 in FIGS.

3 and 4) of pressing the brake plate 92 (92b) and strongly presses the brake plate 92 (92b). Thereafter, the hand wheel 80 and the drive shaft 70 are rotated integrally, and a driving force caused by this rotation is transmitted via the pinion gear 72, the large-diameter gear 61, and the small-diameter gear 62 to the load gear 31 to cause the load sheave hollow shaft 20 to be rotated. Accordingly, the load chain C1 is wound up, and the load is hoisted.

Conversely, in a case in which the load being hoisted is lowered, the hand chain C2 is fed in a reverse direction of a direction when the load is hoisted. This causes the hand wheel 80 to loosen the press toward the brake plate 92b. The drive shaft 70 is rotated in a reverse direction of the upward winding direction of the load as much as the loosened amount. Thus, the load is gradually lowered.

Meanwhile, in a stop state of the ratchet wheel 94, the tip end of each pawl member 95 meshes with the tooth portion 94a of the ratchet wheel 94. Also, even when one takes one's hand off the hand chain C2 at the time of upward winding and tries to reversely rotate the drive shaft 70 by means of gravity of the load, the brake plate 92b is pressed to the ratchet wheel 94 by the hand wheel 80, and the brake plate 92a is pressed to the flange portion 91b of the brake receiver 91 by the ratchet wheel 94 in a state in which the hand wheel 80 is not rotated. Thus, a brake force against the gravity of the load is applied, and the load is prevented from being lowered.

(2) About Operations when Chain Block 10 is Dragged

Next, operations when the aforementioned chain block 10 is dragged will be described below. In a case in which a user drags the chain block 10 in a state of gripping the load chain C1, the chain block 10 is dragged in the standing posture in which the first frame 11 and the second frame 12 contact the ground, in a posture in which the ceiling surface of the gear case 13 faces down, or in a posture in which the protrusion 143a of the wheel cover 14 faces down.

Here, in the case in which the chain block 10 is dragged in the falling posture in which the ceiling surface of the gear case 13 faces down, an action point of a force to the chain block 10 by the load chain C1 is located further on an upper side than the protrusion 143a. In addition, the weight W2 of the side of the wheel cover 14 resides further on the upper side than the protrusion 143a. Hence, the weight W2 resides in a higher position than the center of the entire chain block 10 (between the first frame 11 and the second frame 12), which brings about an unbalanced state. Accordingly, as the chain block 10 is dragged, the chain block 10 eventually gets in the standing posture.

Also, in the case in which the chain block 10 is dragged in the falling posture in which the wheel cover 14 faces down, the action point of the force to the chain block 10 by the load chain C1 is located on the upper side, and the weight W1 of the side of the gear case 13 resides further on the upper side. Hence, the weight W1 resides in a higher position than the center of the entire chain block 10, which brings about an unbalanced state. Accordingly, as the chain block 10 is dragged, the chain block 10 eventually gets in the standing posture.

According to the aforementioned (Equation 1), the dimension b of the chain block 10 in the X direction is equal to or longer than the dimension a of the chain block 10 in the Y direction. In this case, the chain block 10 is configured so that a position of a weighted center may be lower in the standing posture than in the falling posture in which the ceiling surface of the gear case 13 faces down and in the falling posture in which the wheel cover 14 faces down. Also, in the standing posture, no weight body (such as the weight W1 and the weight W2) exists in a higher position than the weighted center in the standing posture, in contrast with the case of the falling posture in which the ceiling surface of the gear case 13 faces down and the case of the falling posture in which the wheel cover 14 faces down. Accordingly, when the chain block 10 is dragged in the standing posture, the posture is stable.

Here, in the case in which the chain block 10 is dragged in the standing posture, the behavior thereof is as follows. First, when the chain block 10 is dragged in the standing posture, the chain block 10 rolls on the ground along the arc shapes of the outer rim portions of the first frame 11 and the second frame 12. However, after slight rolling, any of the frame projection portions 111a, 111b, 121a, and 121b abuts on the ground. This prevents further rolling of the chain block 10.

Here, even when the chain block 10 is further inclined with the gear storage portion 131 facing down in the state in which the frame projection portions 111b and 121b abut on the ground, the gear storage portion 131 contacts the ground at the contact part Q31, and further inclination of the chain block 10 is prevented. Also, as illustrated in FIG. 29, the chain block 10 easily returns from the inclined posture to the standing posture due to the action of the weight W2 of the side of the wheel cover 14. Accordingly, even when the chain block 10 is inclined to the side of the gear case 13, the chain block 10 returns to the standing posture due to the action of the weight W2 of the side of the wheel cover 14.

Even in the case in which the chain block 10 is inclined in the reverse direction, that is, even when the chain block 10 is inclined with the wheel cover 14 facing down in the state in which the frame projection portion 121b abuts on the ground, the wheel cover 14 contacts the ground at the contact part Q33, and further inclination of the chain block 10 is prevented. Also, as illustrated in FIG. 29, the chain block 10 easily returns from the inclined posture to the standing posture due to the action of the weight W1 of the side of the gear case 13. Accordingly, even when the chain block 10 is inclined to the side of the wheel cover 14, the chain block 10 returns to the standing posture due to the action of the weight W1 of the side of the gear case 13.

The chain block 10 repeats inclination either to the side of the gear case 13 or to the side of the wheel cover 14 and return to the standing posture, keeping the state in which the frame projection portions 111b and 121b abut on the ground, and is dragged while being inclined slightly to the right or to the left.

Also, when the chain block 10 is further inclined with the gear storage portion 131 facing down in the state in which the frame projection portions 111a and 121a abut on the ground, or when the chain block 10 is further inclined with the wheel cover 14 facing down in the state in which the frame projection portions 111a and 121a abut on the ground, the behavior thereof is similar to those in the above cases. That is, the chain block 10 repeats inclination either to the side of the gear case 13 or to the side of the wheel cover 14 and return to the standing posture, keeping the state in which the frame projection portions 111a and 121a abut on the ground, and is dragged while being inclined slightly to the right or to the left.

<About Effect>

The load chain C1 is made of a steel material having the Rockwell hardness C scale (HRC) of 47 to 51, and the load sheave hollow shaft 20 is made of a steel material in which at least the chain pocket 23b has the Rockwell hardness C scale (HRC) of 40 to 45.

Thus, although the load chain C1 is in a state in which surface pressure thereof to the load sheave 23 increases since the load chain C1 reduces a diameter thereof, it is possible to restrict an increase of the abrasion amount of the load chain C1. That is, in the case in which the load chain C1 was made of a steel material having the Rockwell hardness C scale (HRC) of 47 to 51, and in which the load sheave hollow shaft 20 was made of a steel material in which at least the chain pocket 23b had the Rockwell hardness C scale (HRC) of 48, which was a similar value, as in Comparative Example 1, the abrasion amount of the load chain C1 increased, and the possibility of breakage of the load chain C1 increased, in the test of applying the rated load. On the other hand, in the case of setting the hardness as in Example 1 according to the present embodiment, the abrasion amount can be lowered.

Thus, the size reduction and weight reduction of the chain block 10 can be achieved, the size of the chain pocket 23b of the load sheave 23 can be reduced, and the load chain C1 with a small diameter can be used. In addition to the decrease of the diameter of the load chain C1, the strength (increase of the stress at rupture) of the load chain C1 can be improved.

Also, in the present embodiment, the load chain C1 is produced to have uniform hardness on the entire cross-section thereof. Hence, even in a case in which uneven abrasion occurs partially on the load chain C1, it is possible to prevent the strength from decreasing significantly in comparison with the load chain hardened only on a surface thereof.

Further, in the present embodiment, the load chain C1 is a quenched and tempered chain to which thermal refining has been applied. Accordingly, the load chain C1 can improve hardness thereof and does not lose viscosity.

Modification Examples

Although the embodiments of the present invention have been described above, the present invention can be altered in various manners. Examples thereof will be described below.

In the above embodiment, the first frame 11 is provided with the frame projection portions 111a and 111b while the second frame 12 is provided with the frame projection portions 121a and 121b, and these frame projection portions function as the rolling restriction portions. However, the configuration of each of the rolling restriction portions is not limited to this configuration. For example, the outer rim portion of each of the first frame 11 and the second frame 12 may be provided to be linear to prevent rolling, and the linear outer rim portion may serve as the rolling restriction portion. Also, the outer rim portion of the first frame 11 may contact the ground at any points as long as at least two points in the outer rim portion of the first frame 11 contact the ground at positions spaced as much as a predetermined rolling prevention distance. Similarly, the outer rim portion of the second frame 12 may contact the ground at any points as long as at least two points in the outer rim portion of the second frame 12 contact the ground at positions spaced as much as a predetermined rolling prevention distance.

Meanwhile, as in the case in which the outer rim portion of each of the first frame 11 and the second frame 12 is provided to be linear, the outer rim portion of each of the first frame 11 and the second frame 12 may not be provided with the recesses 113 or 123.

Also, the rolling restriction portion may be configured by attaching a separate member to each of the first frame 11 and the second frame 12. Similarly, the falling prevention portion may be configured by attaching a separate member to each of the first frame 11 and the second frame 12.

Figure 31:
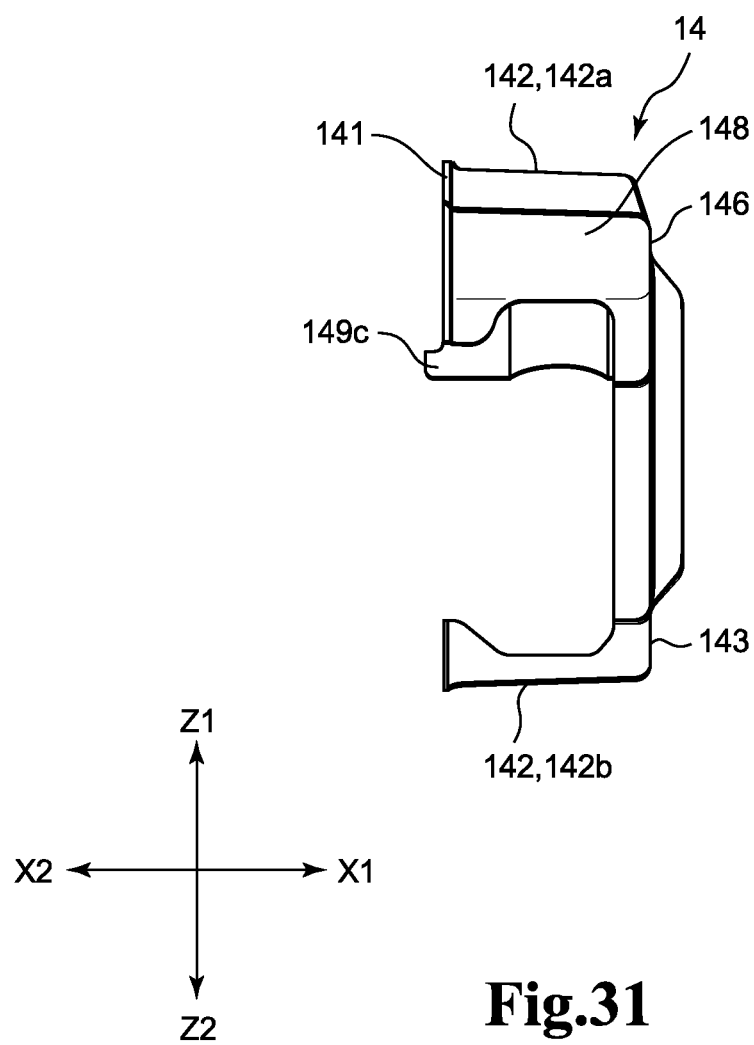
FIG. 31 is a side view illustrating a shape of the wheel cover according to a modification example of the present embodiment.
Figure 32:
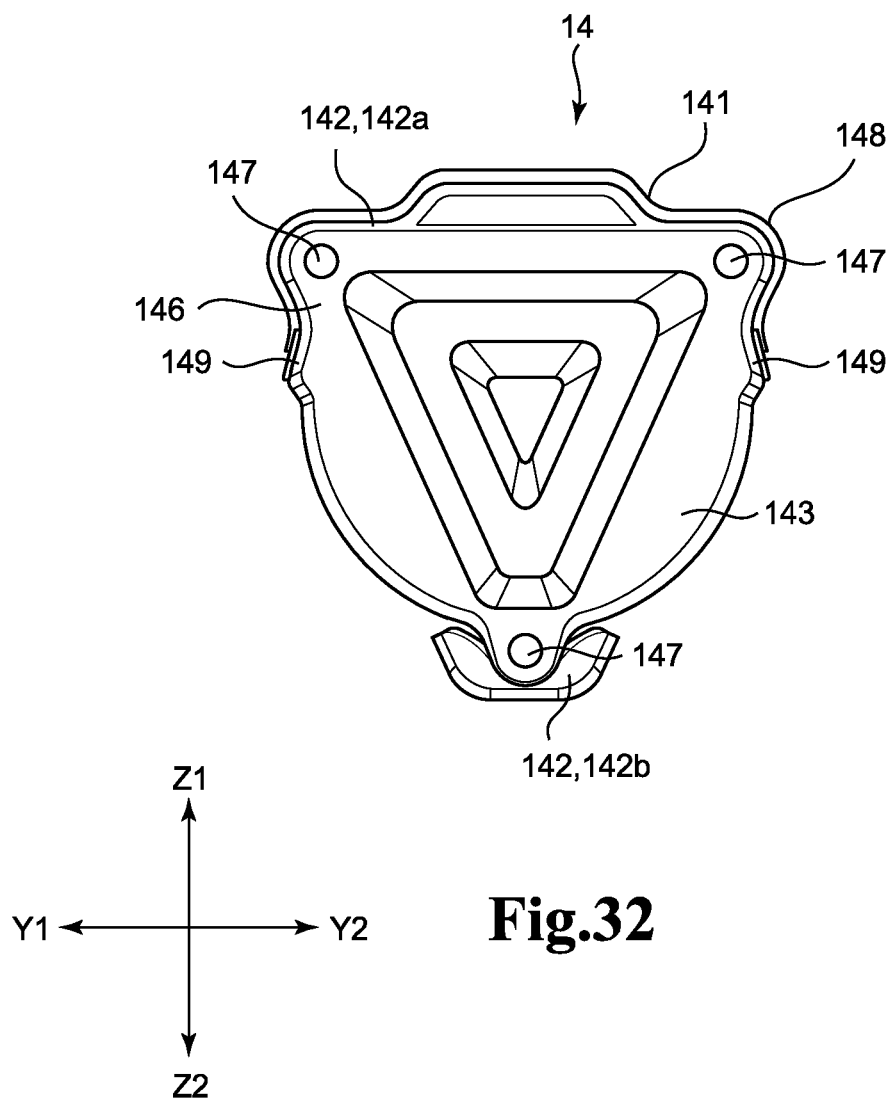
FIG. 32 is a plan view illustrating the shape of the wheel cover according to the modification example of the present embodiment.

Also, in the above embodiment, the chain guide portion 149 is provided integrally in a state of being continuous with the surrounding portion 148. However, as illustrated in FIGS. 31 and 32, the chain guide portion 149 may employ a configuration in which the chain guide portion 149 is provided separately without being continuous with the surrounding portion 148. That is, by attaching the chain guide portion 149 to the end surface portion 143 by means of welding or the like, the chain guide portion 149 may be provided separately from the surrounding portion 148.

In such a configuration, flexibility of an arranging position of the chain guide portion 149 to the end surface portion 143 can be improved. Also, even in this configuration, the surrounding portion 148 still exists in the side surface portion 142, and providing the surrounding portion 148 can thus improve strength of the wheel cover 14.

In such a configuration, flexibility of an arranging position of the chain guide portion 149 to the end surface portion 143 can be improved. Also, even in this configuration, the surrounding portion 148 still exists in the side surface portion 142, and providing the surrounding portion 148 can thus improve strength of the wheel cover 14.

In the above embodiment, the configuration in which the auxiliary plate 50 is fixed on the first frame 11 by means of the fixing holes 53 and the fixing tools 55 is described. However, instead of the combination of the fixing holes 53 and the fixing tools 55, at least one combination of a boss hole and a boss may be used, or the auxiliary plate 50 may be fixed on the first frame 11 by means of welding or the like.

REFERENCE SIGNS LIST

10 . . . Chain block
11 . . . First frame
11d, 12d . . . Catching hole
12 . . . Second frame
13 . . . Gear case
14, 14H . . . Wheel cover
20 . . . Load sheave hollow shaft (corresponding to load sheave member)
23 . . . Load sheave
23b . . . Chain pocket
30 . . . Speed reducing mechanism
40 . . . Upper hook
42 . . . Guide roller
43, 43P . . . Fastener
43a . . . Metal pin
43b . . . Boss portion
43c, 43Pc . . . Escape portion
44, 44P . . . Stripper
44a, 44c . . . Inclined portion
44b . . . Straight portion
44Pb . . . Straight portion
45, 45P . . . Lower hook
45a, 45Pa . . . Lever
45a1 . . . Inclined portion
70 . . . Drive shaft
80, 80P . . . Hand wheel
80f . . . Storage portion
82, 82P . . . Chain pocket
82c, 82Pc . . . Lateral link mountain
83 . . . Washer
84 . . . Groove Nut
90 . . . Brake mechanism 92, 92a, 92b . . . Brake plate
93 . . . Bush
93c . . . Dent portion
96 . . . Brake cover
96a . . . Boss portion
100 . . . Excessive load prevention mechanism
101a, 101b . . . Friction plate
102, 104 . . . Washer
103 . . . Plate spring
105 . . . Fastening member
131 . . . Gear storage portion
132 . . . Name plate
132a . . . Lower recess
132b . . . Upper recess
142 . . . Side surface portion
142a . . . Upper side surface portion
142a1, 142a3 . . . Upper guide portion
142a2 . . . Upper projection portion
142b . . . Lower side surface portion
143a . . . Protrusion
143b . . . Recess
160 . . . One-way clutch mechanism
161 . . . Ball
C1 . . . Load chain
C1a, C2a . . . Metal ring
C1b . . . Uneven abrasion part
C2 . . . Hand chain
SB . . . Stay bolt

The invention claimed is:

1. A chain block comprising:
a load chain which hangs a load; and
a load sheave member which is rotatably supported between a first frame and a second frame, around which the load chain is wound, and which has a chain pocket in which the load chain goes,
the load chain being made of a steel material having the Rockwell hardness C scale (HRC) of 47 to 51,
the load sheave member being made of a steel material in which at least the chain pocket has the Rockwell hardness C scale (HRC) of 40 to 45, and
the load chain having uniform hardness on an entire cross-section thereof and being a quenched and tempered chain to which thermal refining has been applied.

2. The chain block according to claim 1, wherein the load sheave member is rotatably supported by a frame member via a bearing, and the Rockwell hardness C scales (HRC) of the bearing, the load chain, the load sheave member, and the frame member satisfies a relation of:

the bearing>the load chain>the load sheave member>the frame member.

* * * * *